(12) United States Patent
Li

(10) Patent No.: US 8,172,451 B2
(45) Date of Patent: May 8, 2012

(54) PROGRAMMABLE ELECTRONIC HAND MIXER

(75) Inventor: Wing Chung Li, Hong Kong (HK)

(73) Assignee: ARCFL Technology Limited, Hong Kong (HK)

( * ) Notice: Subject to any disclaimer, the term of this patent is extended or adjusted under 35 U.S.C. 154(b) by 687 days.

(21) Appl. No.: 12/251,464

(22) Filed: Oct. 15, 2008

(65) Prior Publication Data

US 2009/0097351 A1 Apr. 16, 2009

Related U.S. Application Data

(60) Provisional application No. 60/690,824, filed on Oct. 16, 2007.

(51) Int. Cl.
*A47J 43/07* (2006.01)
(52) U.S. Cl. ......... 366/129; 366/142; 366/206; 366/601
(58) Field of Classification Search ............... 366/129, 366/142, 197, 199, 342, 343, 349, 206, 601, 366/205; 388/934, 936
See application file for complete search history.

(56) References Cited

U.S. PATENT DOCUMENTS

| | | | | | |
|---|---|---|---|---|---|
| 3,169,395 | A | * | 2/1965 | Enoch et al. | 73/169 |
| 4,152,079 | A | * | 5/1979 | Raitt | 266/155 |
| 4,455,091 | A | * | 6/1984 | Bamberger et al. | 366/76.7 |
| 4,790,665 | A | * | 12/1988 | Hayashi | 366/98 |
| 4,822,172 | A | * | 4/1989 | Stottmann | 366/142 |
| 4,893,942 | A | * | 1/1990 | Stottmann | 366/279 |
| 5,372,422 | A | * | 12/1994 | Dubroy | 366/143 |
| 6,145,373 | A | * | 11/2000 | Tymchuck | 73/54.28 |
| 6,364,522 | B2 | * | 4/2002 | Kolar et al. | 366/206 |
| 6,397,735 | B1 | * | 6/2002 | Wong | 99/492 |
| 6,402,365 | B1 | | 6/2002 | Wong | |
| 6,517,232 | B1 | * | 2/2003 | Blue | 366/297 |
| 6,585,404 | B2 | * | 7/2003 | Barton et al. | 366/142 |
| 6,632,013 | B2 | * | 10/2003 | Wulf et al. | 366/199 |
| 6,656,515 | B2 | * | 12/2003 | Lowry et al. | 426/231 |
| 6,827,476 | B2 | * | 12/2004 | Lowry et al. | 366/97 |
| 7,207,711 | B2 | * | 4/2007 | Huang et al. | 366/206 |
| 7,273,315 | B2 | * | 9/2007 | Huang et al. | 366/206 |
| 7,751,934 | B2 | * | 7/2010 | Konietzko | 700/239 |
| 7,950,842 | B2 | * | 5/2011 | Pryor et al. | 366/142 |
| 7,959,347 | B2 | * | 6/2011 | Pryor et al. | 366/142 |
| 2002/0009017 | A1 | * | 1/2002 | Kolar et al. | 366/206 |
| 2002/0018398 | A1 | * | 2/2002 | Krall et al. | 366/129 |
| 2002/0051405 | A1 | * | 5/2002 | Juriga et al. | 366/129 |
| 2004/0120215 | A1 | * | 6/2004 | Huang et al. | 366/203 |
| 2006/0044935 | A1 | * | 3/2006 | Benelli et al. | 366/145 |
| 2007/0171766 | A1 | * | 7/2007 | Loiselet | 366/92 |
| 2008/0221739 | A1 | * | 9/2008 | Pryor et al. | 700/292 |
| 2009/0067279 | A1 | * | 3/2009 | Mulle et al. | 366/142 |
| 2009/0109792 | A1 | * | 4/2009 | Ciancimino et al. | 366/142 |
| 2009/0110788 | A1 | * | 4/2009 | Ciancimino et al. | 426/231 |
| 2010/0246319 | A1 | * | 9/2010 | Pryor et al. | 366/205 |
| 2011/0096619 | A1 | * | 4/2011 | Pryor et al. | 366/205 |

\* cited by examiner

*Primary Examiner* — Yogendra Gupta
*Assistant Examiner* — Emmanuel S Luk

(57) ABSTRACT

An electronic hand mixer for processing food materials is provided. The electronic hand mixer includes one or more beaters, a housing, and a drive motor mounted in the housing. The drive motor is adapted to apply rotational force to the beaters. The electronic hand mixer also includes a power control device for controlling electrical power supplied to the drive motor, a keypad for receiving instructions entered by users, a microprocessor for processing and carrying out the instructions and sending signals to the power control device, and a memory for storing the instructions. The instructions include at least one user-defined mixing course for conducting a mixing operation. The user-defined mixing course includes one or more mixing operations, and each of the mixing operations includes a user-defined running speed of the drive motor associated with a user-defined running period of time of the drive motor.

20 Claims, 24 Drawing Sheets

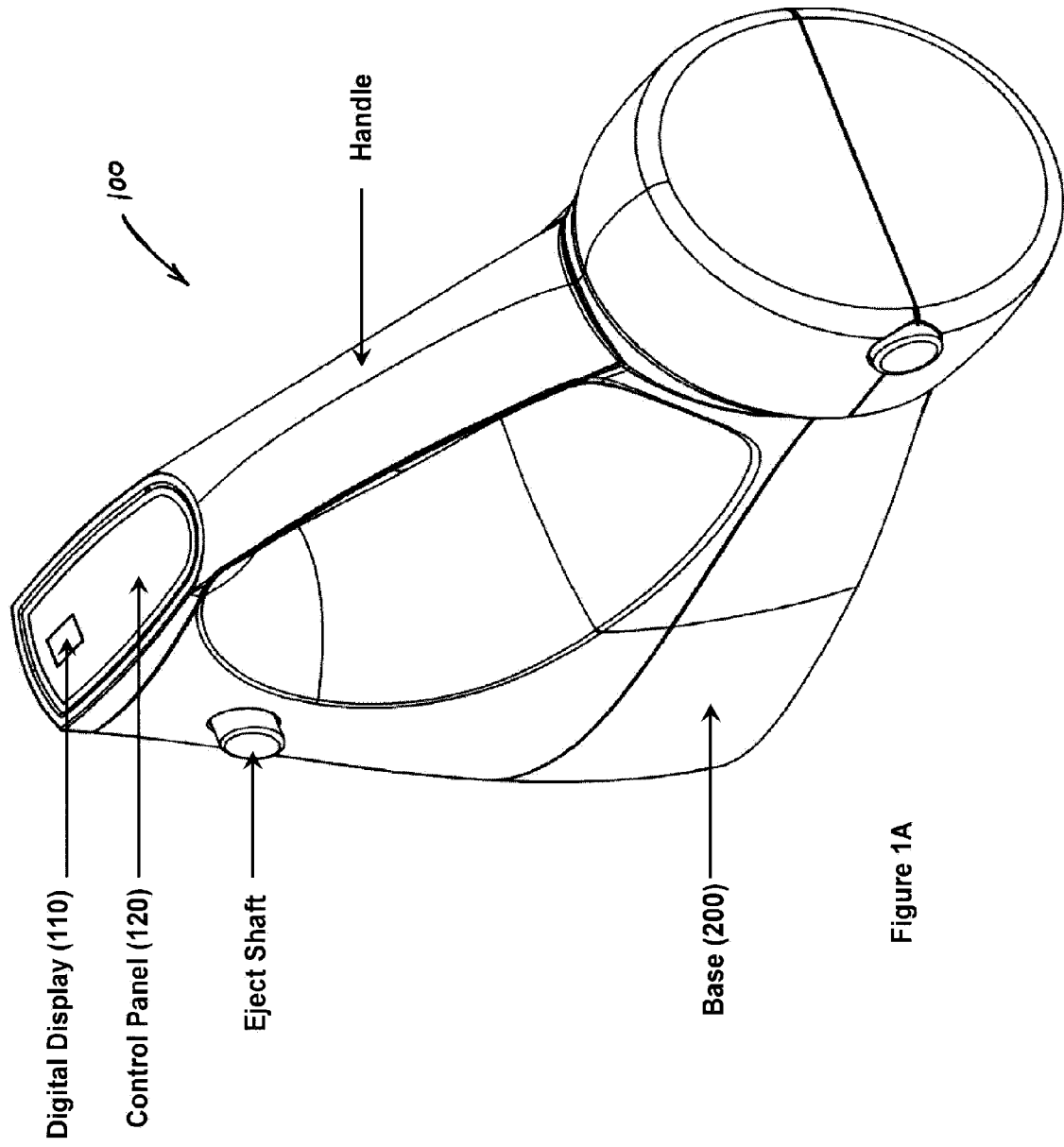

TRIAC Waveform

PROGRAMMABLE ELECTRONIC HAND MIXER

CROSS REFERENCE OF RELATED PATENT APPLICATION

The present patent application claims the benefit of U.S. Provisional Patent Application Ser. No. 60/960,824, filed Oct. 16, 2007, which is incorporated by reference herein in its entirety.

FIELD OF THE PATENT APPLICATION

The present patent application relates to a household hand mixer for mixing food materials.

BACKGROUND

Conventional household hand mixers have an array of mechanical switches for speed selection. When a selected speed switch is engaged, the hand mixer operates at the selected speed until the operator pushes an off switch that mechanically disengages the speed switch. Some conventional hand mixers already have feedback systems. However, the speed stability and speed accuracy is not satisfactory, especially when the hand mixer runs at a low speed and under a heavy loading condition. This makes the mixing result inconsistent and sometimes causes the motor to burn due to the heating efficiency positive feedback. Some conventional hand mixers already have a count up timer feature. All conventional electronic hand mixers have a manual power off feature. However, no one have an auto shut off feature.

Some aspects of conventional hand mixers have safety hazard. For example, a conventional hand mixer that is not equipped with a timer will continue to run if left unattended, especially when using the hand mixer as a stand mixer.

If a conventional hand mixer is used to do a complicated mixing course, which combines several stages with different speed associated with different time, the user has to control the mixing time for each stage manually. In addition, the user must rely on his or her memory and/or visual observation of the results to make a successful mixing cycle.

SUMMARY

The present patent application is directed to an electronic hand mixer for processing food materials. In on aspect, the electronic hand mixer includes one or more beaters, a housing, and a drive motor mounted in the housing. The drive motor is adapted to apply rotational force to the beaters. The electronic hand mixer also includes a power control device for controlling electrical power supplied to the drive motor, a keypad for receiving instructions entered by users, a microprocessor for processing the instructions and sending signals to the power control device, and a memory for storing the instructions. The instructions include at least one user-defined mixing course for conducting a mixing operation. The user-defined mixing course includes one or more mixing operations, and each of the mixing operations includes a user-defined running speed of the drive motor associated with a user-defined running period of time of the drive motor.

In another aspect, the electronic hand mixer includes one or more beaters, a housing, and a drive motor mounted in the housing. The drive motor is adapted to apply rotational force to the beaters. The electronic hand mixer also includes a power control device for controlling electrical power supplied to the drive motor, and a microprocessor for processing instructions and sending signals to the power control device. The power control device is responsive to a speed error signal to adjust the electronic power supplied to the drive motor resulting in an actual speed of the drive motor being within a predetermined speed range irrespective of work load of the electronic hand mixer.

In yet another aspect, the electronic hand mixer includes one or more beaters, a housing, and a drive motor mounted in the housing. The drive motor is adapted to apply rotational force to the beaters. The electronic hand mixer also includes a power control device for controlling electrical energy supplied to the drive motor, a keypad for receiving instructions entered by users, a microprocessor for processing the instructions and sending signals to the power control device, and a memory for storing the instructions. The instructions include a user-defined running period of time of the drive motor at a predetermined running speed of the drive motor. The drive motor is adapted to run to conduct a first mixing operation until the user-defined running period of time expires. The user-defined running period of time is stored in the memory for being used for conducting a second mixing operation.

BRIEF DESCRIPTION OF THE DRAWINGS

FIGS. 1A, 1B and 1C show an embodiment of a programmable electronic hand mixer.

DETAILED DESCRIPTION

Figure 1B:
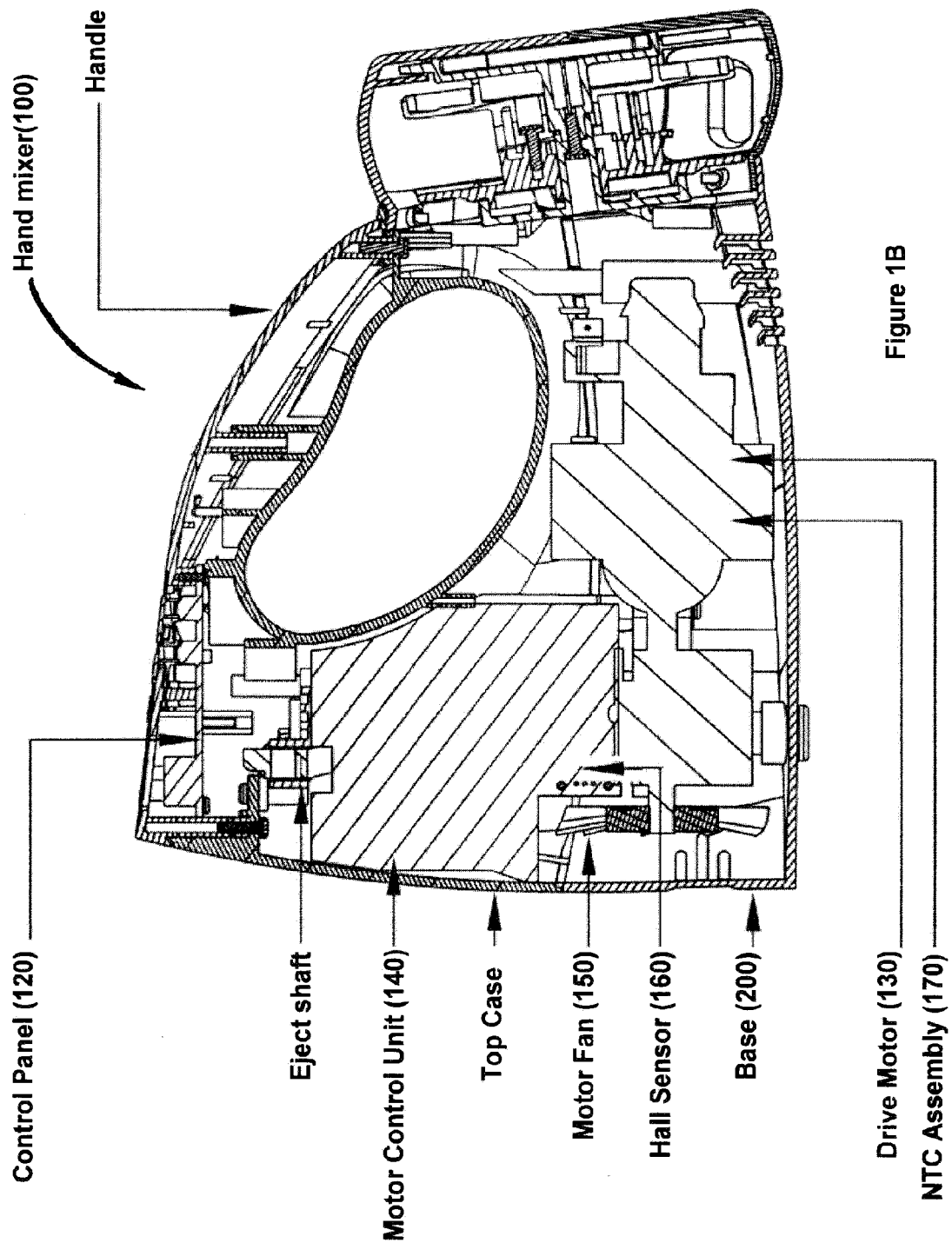
Figure 1C:
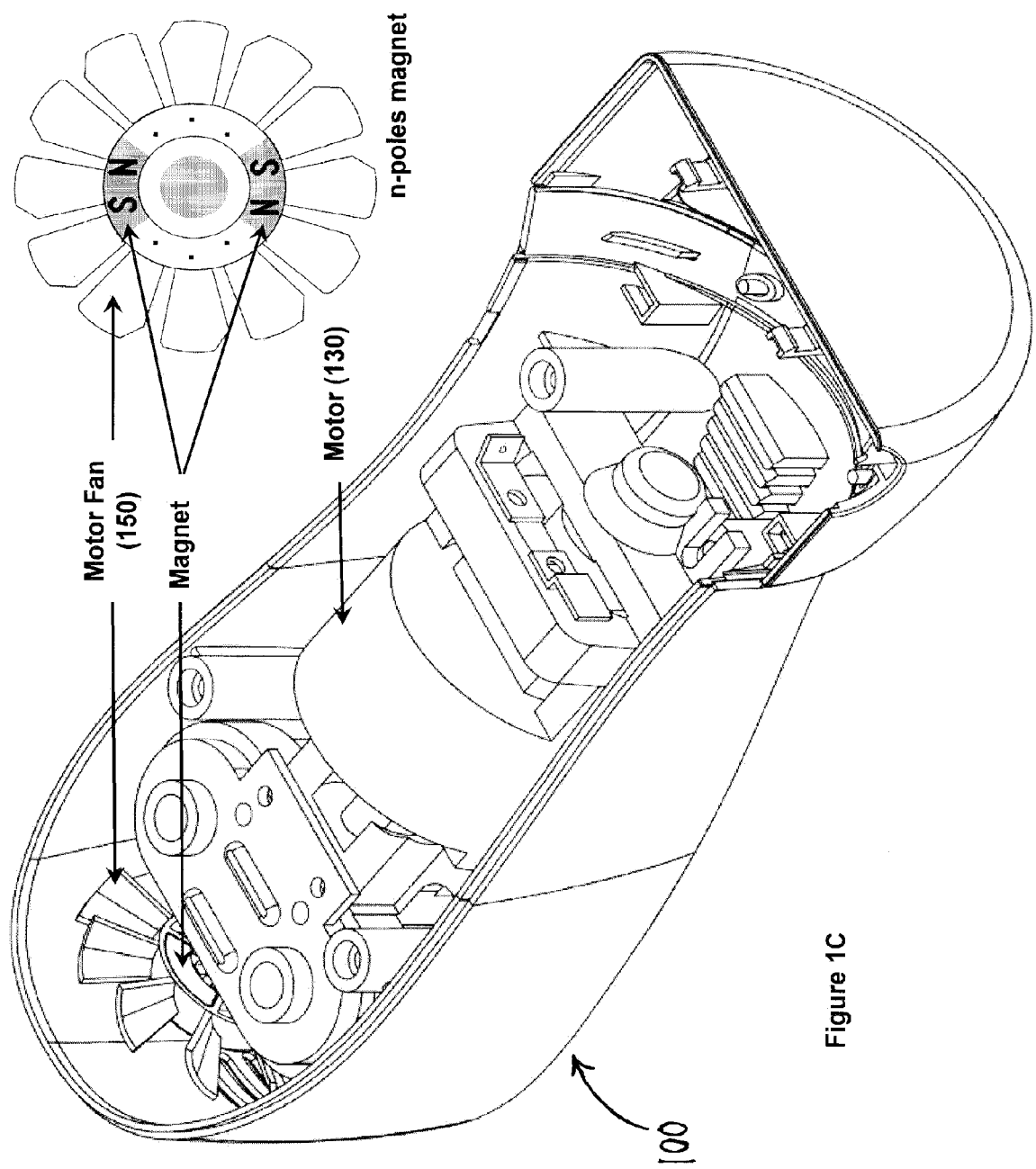
Figure 2:
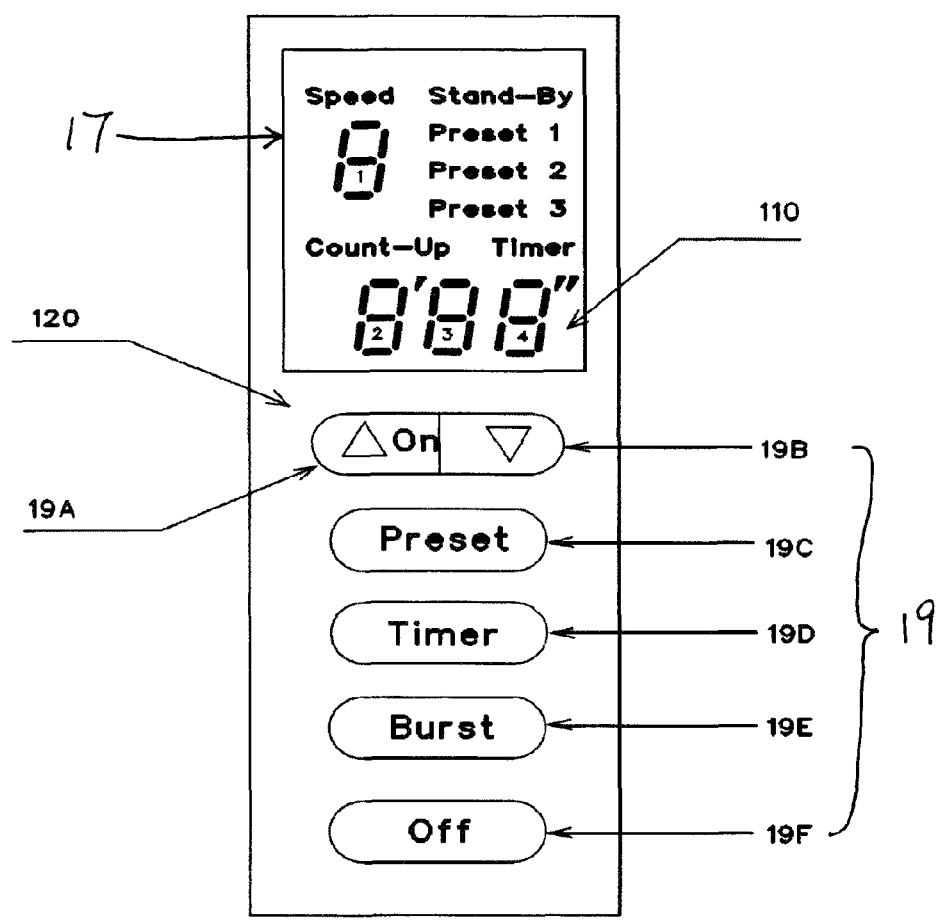
FIG. 2 is a plan view of a control panel appropriate for use in conjunction with the programmable electronic hand mixer.

Referring more particularly to FIGS. 1A, 1B and 1C, an embodiment of a programmable electronic hand mixer 100 includes at least one beaters inserted to a base 200 containing a drive motor 130, a motor fan 150, a NTC assembly 170, a hall sensor 160, a motor control unit 140, and an exterior control panel 120. Referring to FIG. 2, the programmable electronic hand mixer 100 also has a display portion including a digital display (LCD or LED) 110 and LED indicators.

Figure 3A:
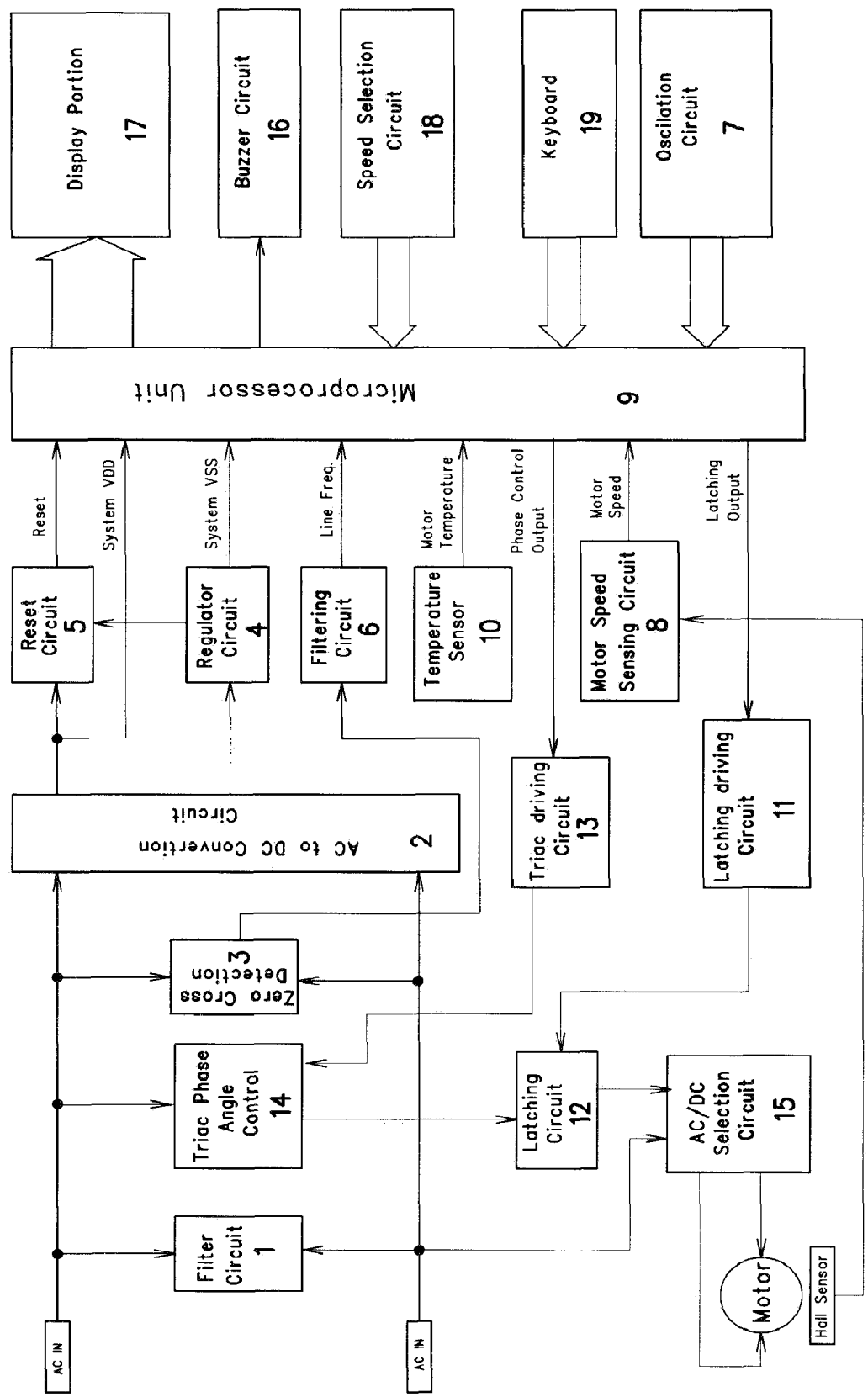
FIGS. 3A and 3B are functional block diagrams of the programmable electronic hand mixer.
Figure 3B:
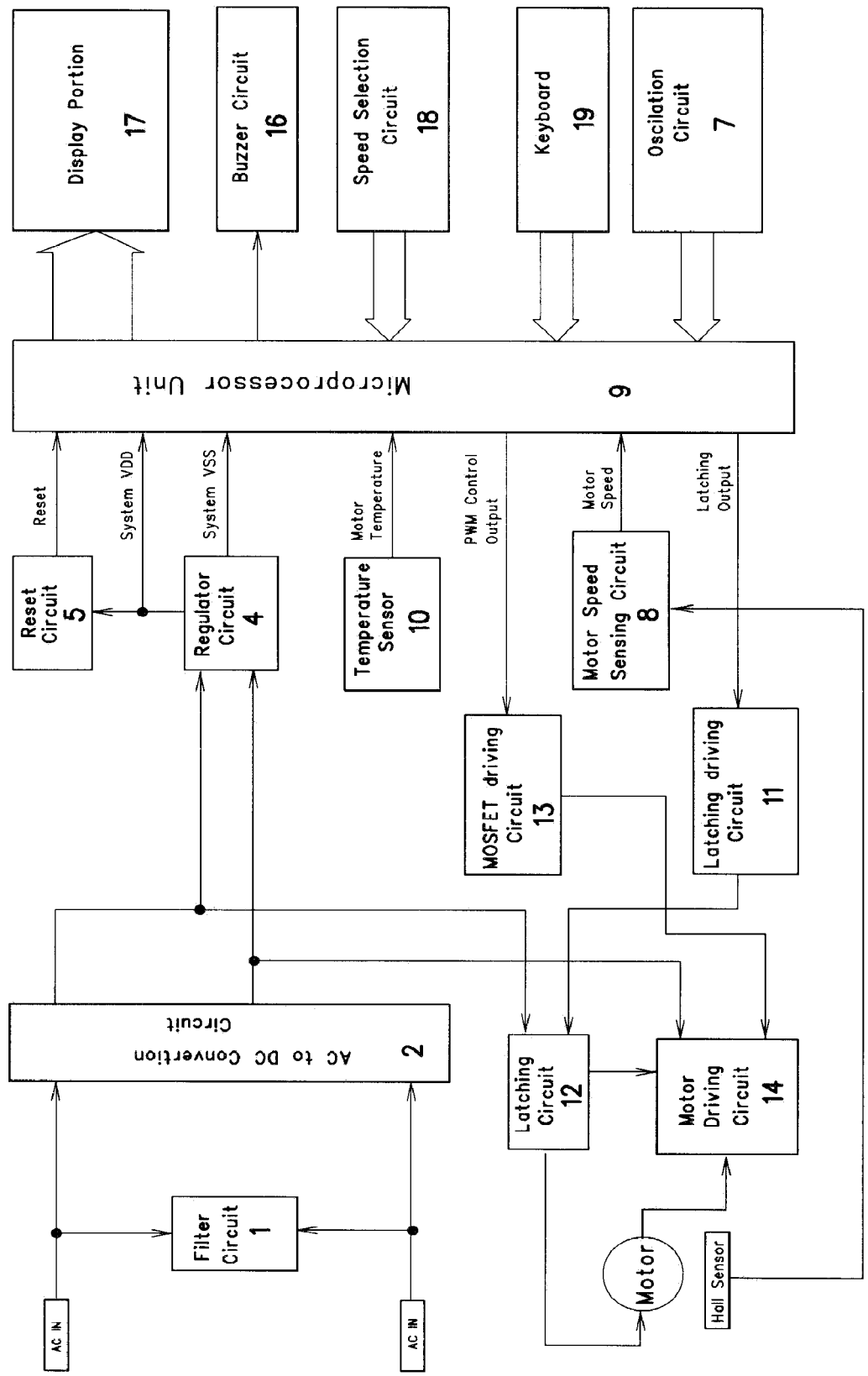
Figure 4A:
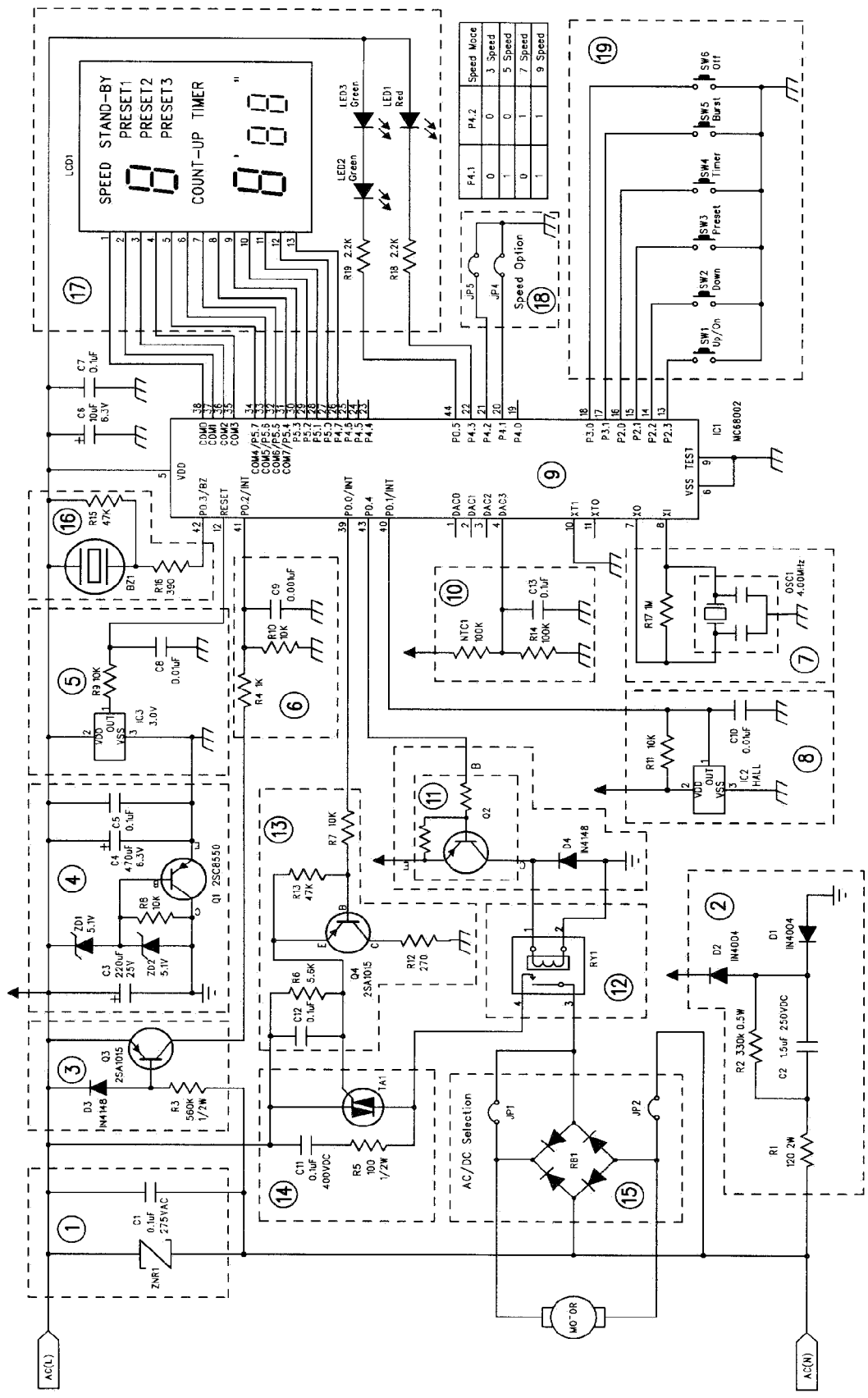
FIGS. 4A and 4B are schematic diagrams of the programmable electronic hand mixer.
Figure 4B:
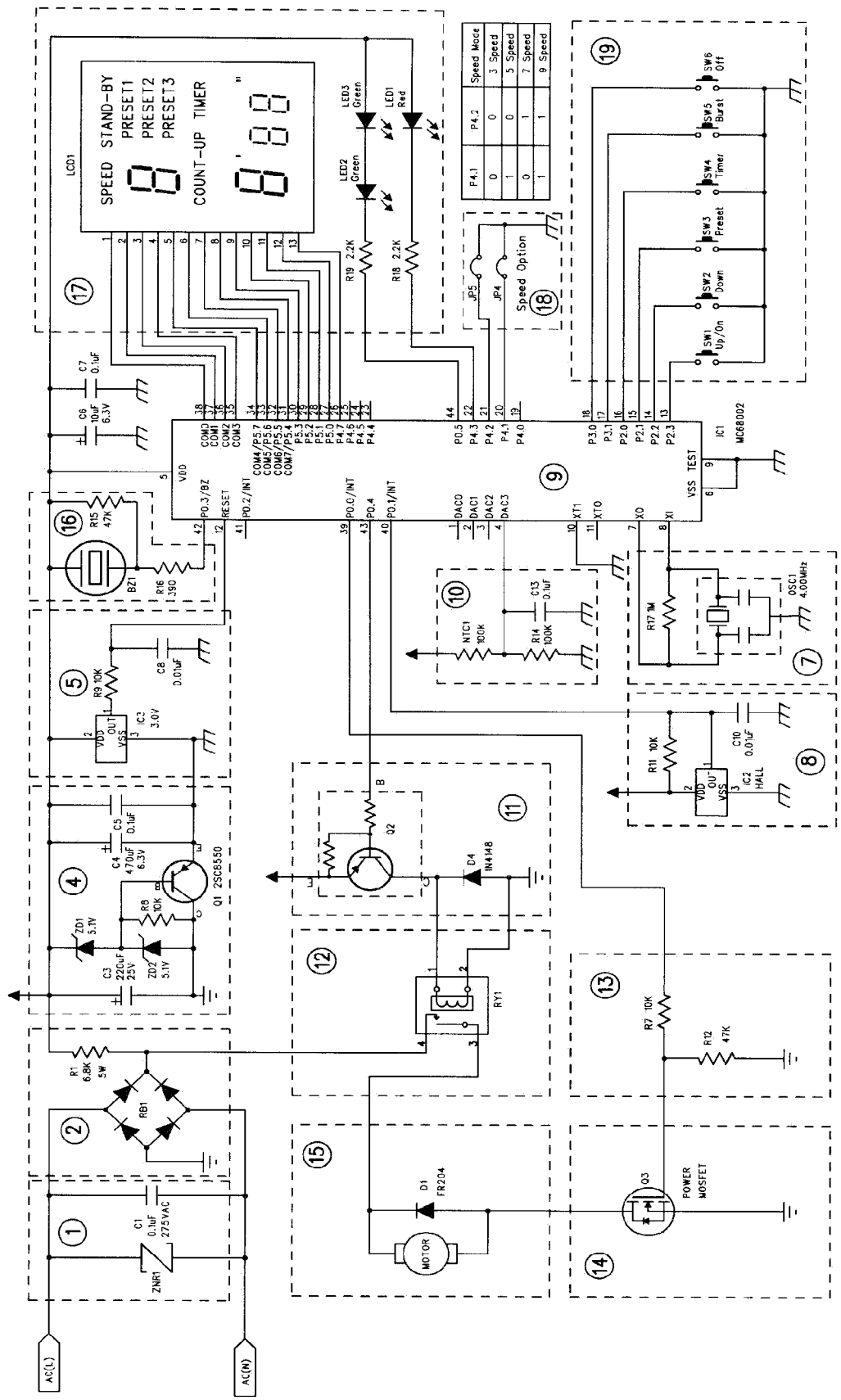

The various capabilities and functional components of the programmable electronic hand mixer are best introduced with reference to the functional blocks (FIGS. 3A and 3B) and schematic diagrams (FIGS. 4A and 4B). Incoming alternating current (AC) is converted to direct current (DC) in a converter circuit 2 and applied to the electronic portions of the programmable electronic hand mixer. A regulator circuit 4 conditions and regulates the DC provided to the micro-controller 9. Once the "on" switch (the "ON" key 19A in FIG. 2) is closed, one of the first tasks of the micro-controller 9 is to provide a latching signal to a relay driving circuit 11, which in turn applies DC current to the coil of latching relay RY1. The micro-controller 9, relay driving circuit 11, and latching relay RY1 maintain power to the motor circuitry if any speed or preset courses is selected. The micro-controller 9 also can shut off the motor power completely after a pre-determined period of inactivity.

A zero detection 3 and a filtering circuit 6 provide a shaped signal to the micro-controller 9 corresponding to each zero-cross of the household AC current. This shaped signal is used by the micro-controller 9 to synchronize a TRIAC driving circuit 13 with the household AC if TRIAC is used as a power control device. The micro-controller 9 sends trigger signals to the TRIAC driving circuit 13 to advance or retard the triggering (turn on) point of the TRIAC in the motor driver 14. An advanced triggering point provides increased power to the motor 130, while a retarded triggering point decreases power to the motor 130. The motor 130 is driven at higher speeds when higher power is provided and lower speeds when lower power is provided. This enables the micro-controller 9 to alter motor speed electronically.

An oscillation circuit 7 provides high frequency clock pulses that the micro-controller 9 uses to synchronize its internal functions. A hall effect IC 8 is used as a motor speed sensor to sense the motor actual running speed under the operation mode. A buzzer circuit 16 permits the audible indication of functional conditions to the user. A motor temperature sensor 10 provides a temperature signal to the micro-controller unit 9, so that the micro-controller unit 9 could stop the motor running and send out a warning signal (visible and auditable signal) to the user if motor temperature or temperature rising ratio is over a predetermined maximum value under heavy load conditions. A reset circuit 5 provides a reset signal to the micro-controller 9 to initialize the micro-controller 9 and place the micro-controller 9 in standby mode, such that the mixer is ready for operation.

In the illustrated embodiment, the micro-controller 9 incorporates a microprocessor, programmable read-only memory (PROM) or erasable programmable read-only memory (EPROM) and random access memory (RAM), as well as buffers and circuitry for the reception and manipulation of various inputs and outputs. The RAM memory is volatile, or as is known in the art, temporary shortage for data. Resetting the micro-controller or removing power from the programmable electronic hand mixer will erase what are stored in the RAM. The microprocessor, memory, buffers and circuitry are typically incorporated into a single integrated circuit or chip package that is referred to as a micro-controller. In the illustrated embodiment, instructions or programs can be installed in the programmable memory. These instructions or programs will be discussed below with reference to FIGS. 5-16.

The RAM can be used to store the power level and duration characteristics of a user-selected preset mixing cycle as will be further discussed below.

Referring back to FIG. 2, the keyboard 19 and a display portion 17 are incorporated into a control panel 120 to provide a user interface for the programmable electronic hand mixer. The control panel 120 may include a digital display portion 110 and LED indicators for standby indication and backlighting purpose. The display shows, preferably in digital format, the results of the elapsed or countdown timers included in the micro-controller programs, depending on the circumstances. The display 110 also indicates several functional conditions, such as the selected preset course. The illustrated embodiment 100 has several preset mixing courses with combined different speed and time in each course for user selection. The preset mixing courses simplify the operation and achieve a generally consistently result.

The control panel has a plurality of contact-type switches. These switches are normally open and closed by pressing the keys on the control panel 120. The functions of these switches are best discussed with reference to FIG. 2. The function of "on" switch (the "ON" key 19A) has already been discussed. The "off" switch (the "OFF" key 19F) provides a signal to the micro-controller 9, causing the micro-controller to interrupt current to latching relay RY1 and cut off the power from the programmable electronic hand mixer. The preset switch (the "Preset" key 19C) is used to select the preset courses for mixing cycles. The timer switch (the "Timer" key 19D) is used to activate or deactivate the countdown timer of the mixer. The burst switch (the "Burst" key 19E) is used to activate or deactivate the operation of the motor in a maximum speed. The previous operation conditions will be resumed after the burst feature is deactivated. The "on" switch can also be used as the "up" switch working with the "down" switch for selecting a desired mixing speed and time.

The micro-controller 9 contains programmed instructions responding to the operation of the various switches of the control panel 120. FIGS. 5-16 are flow charts illustrating portions of the programmed instructions.

The ease of use and overall utility of the programmable electronic hand mixer are enhanced by the particular programmed instructions installed in micro-controller 9.

Figure 5:
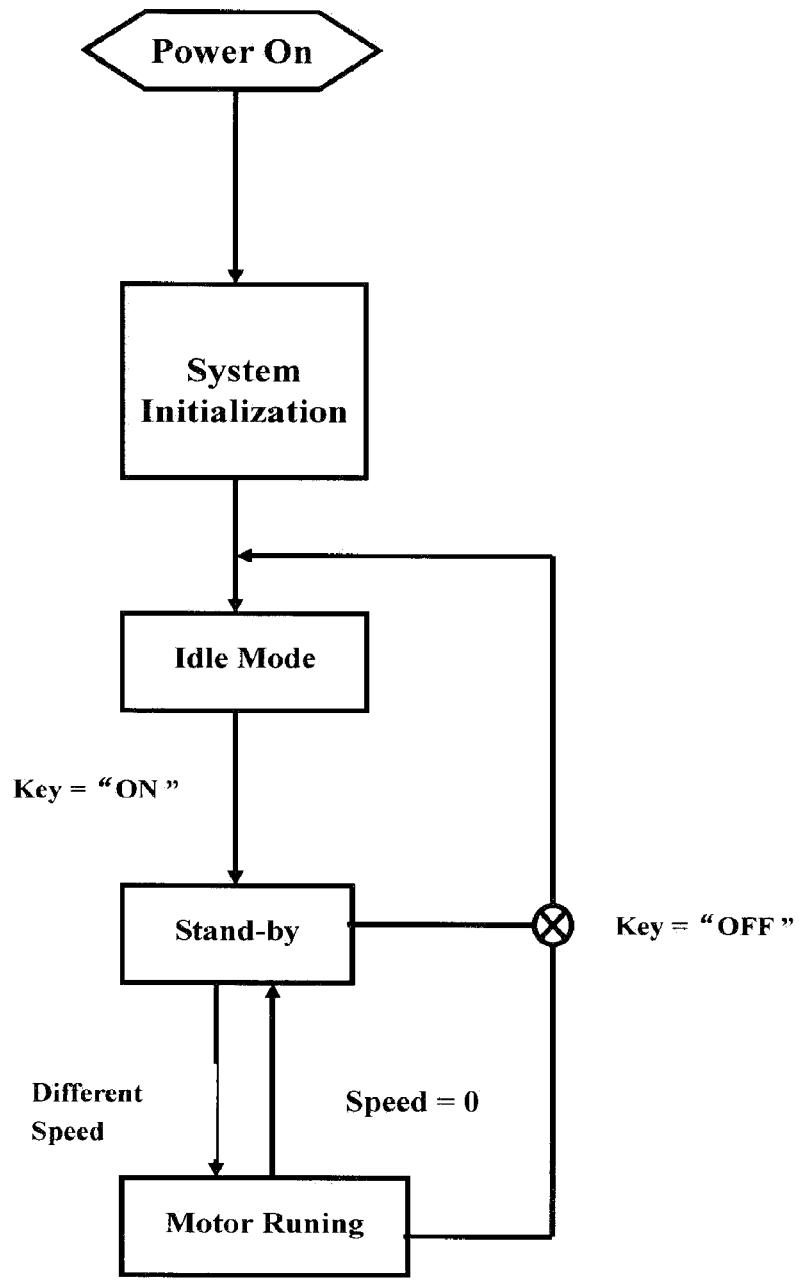
FIG. 5 is a flowchart showing the operation of the programmable electronic hand mixer.

FIG. 5 is a flowchart showing the operation of the programmable electronic hand mixer. Upon initialization, the micro-controller 9 enters into the idle mode. If the "on" switch is closed (the "ON" key 19A in FIG. 2 is pressed), the micro-controller 9 enters into the standby mode, such that the hand mixer is ready for operation. When different motor speeds are selected, the motor starts to run at different speeds. When the motor speed is set to zero, the micro-controller 9 enters into the standby mode.

Figure 6:
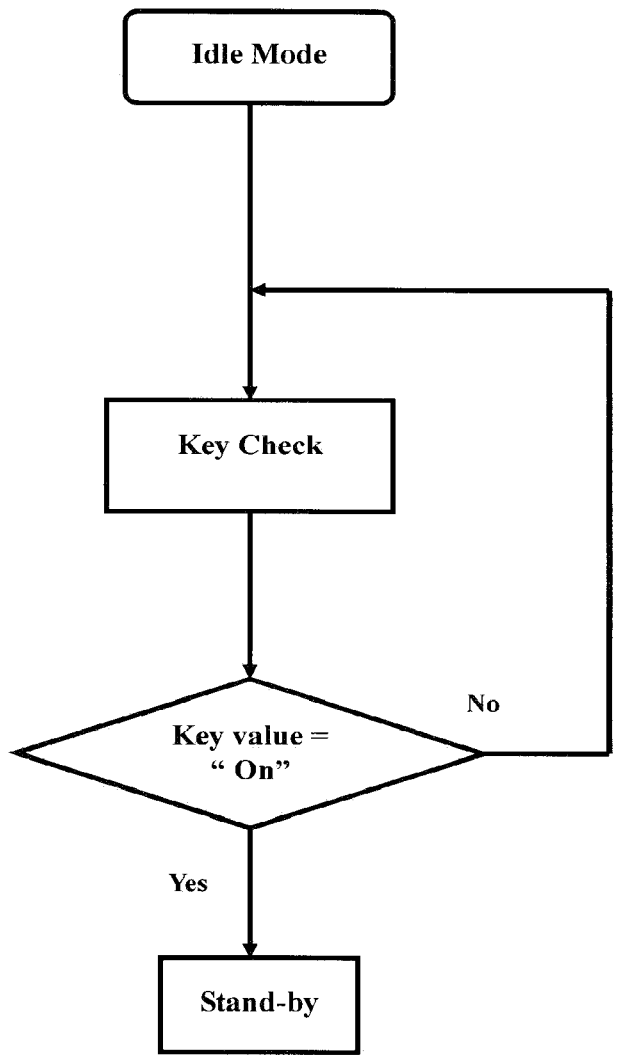
FIG. 6 is a flowchart illustrating the idle mode of the programmable electronic hand mixer.

FIG. 6 is a flowchart illustrating the idle mode of the programmable electronic hand mixer. In the illustrated embodiment, the micro-controller 9 is responsive to the closure of the "on" switch (the "ON" key 19A in FIG. 2 is pressed). If the "on" switch 19A is not closed, the micro-controller 9 remains at the idle mode. If the "on" switch 19A is closed during the idle mode, the micro-controller 9 will change the hand mixer from the idle mode to the standby mode.

Figure 7:
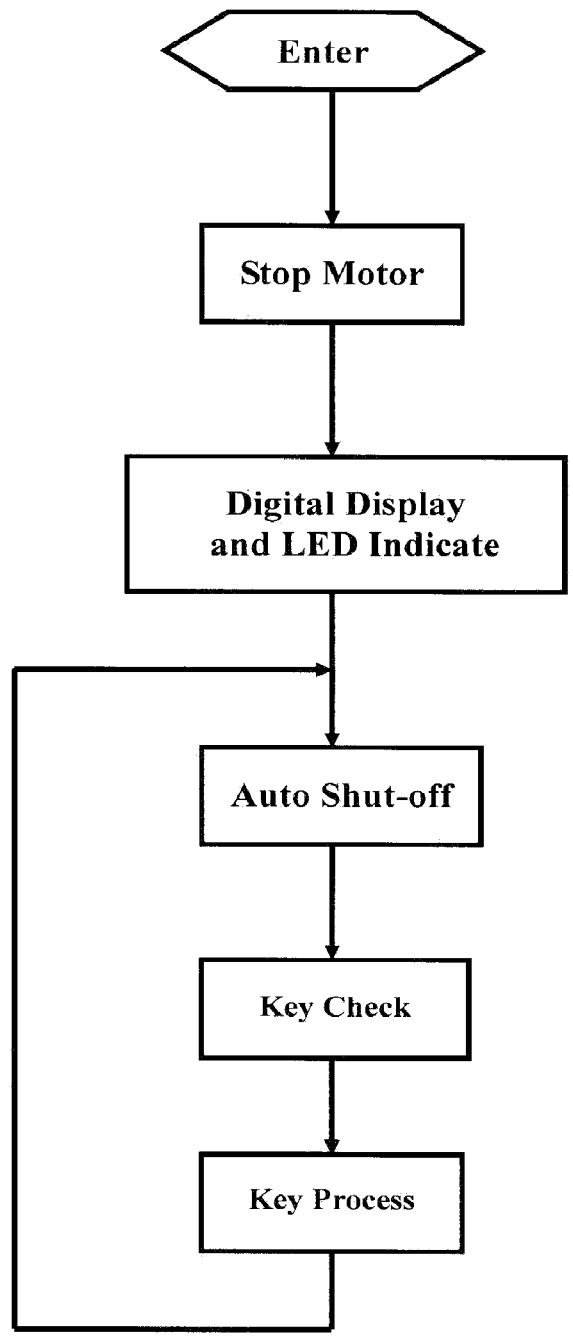
FIG. 7 is a flowchart illustrating the standby mode of the programmable electronic hand mixer.

FIG. 7 is a flowchart illustrating the standby mode of the programmable electronic hand mixer. The micro-controller is programmed with a predetermined maximum standby time $t_{standby\ max}$. If one of the switches is not closed before the predetermined maximum standby time $t_{standby\ max}$ expires, the micro-controller will cut off the power from latching relay RY1 by signaling relay driving circuit 11. The power for driving the motor at the circuitry of the electronic hand mixer will then be cut off. If any switch is closed, the standby timer is reset to the maximum standby time $t_{standby\ max}$. In the standby mode, the operations of the "Up", "Preset", and "Burst" switches (keys 19A, 19C, and 19E in FIG. 2) are also been detected. If these switches are not closed, the micro-controller remains in the standby mode. If one of these switches is closed, micro-controller proceeds to respective program.

Figure 8:
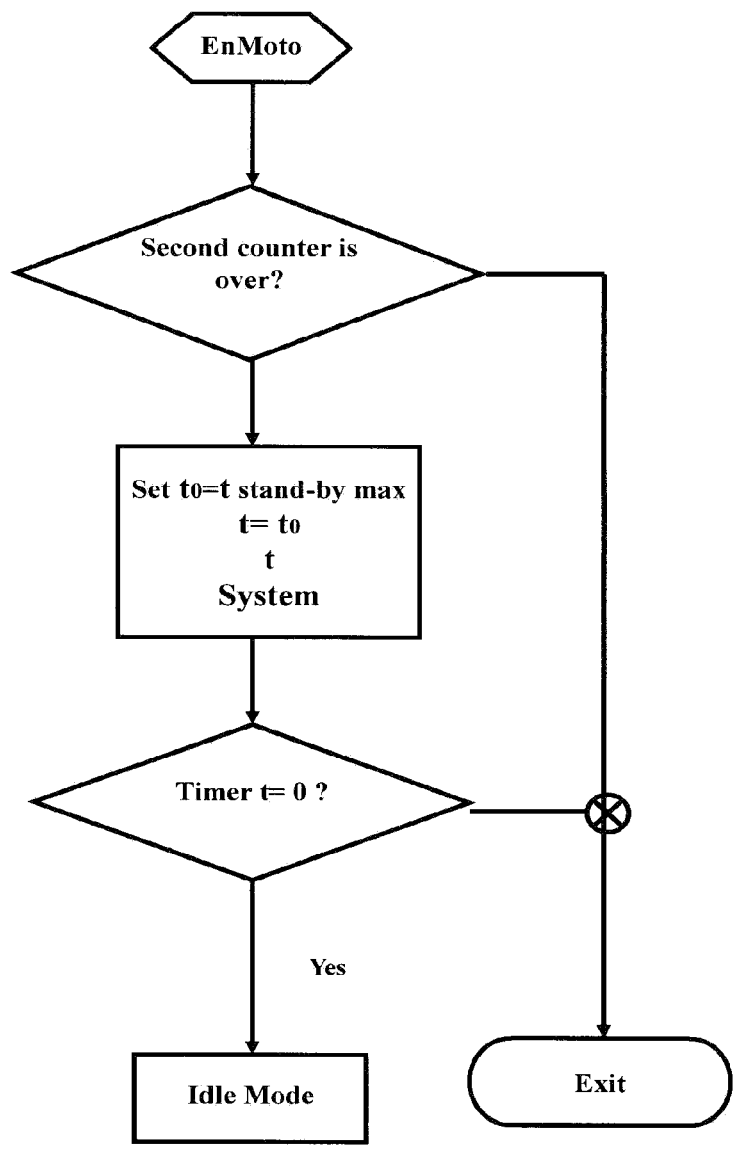
FIG. 8 is a flowchart illustrating the automatic shut-off feature of the programmable electronic hand mixer.

FIG. 8 is a flowchart illustrating the automatic shut-off feature of the programmable electronic hand mixer. If no switch is closed before the predetermined maximum standby time $t_{standby\ max}$ expires, the hand mixer will shut off automatically.

Figure 9:
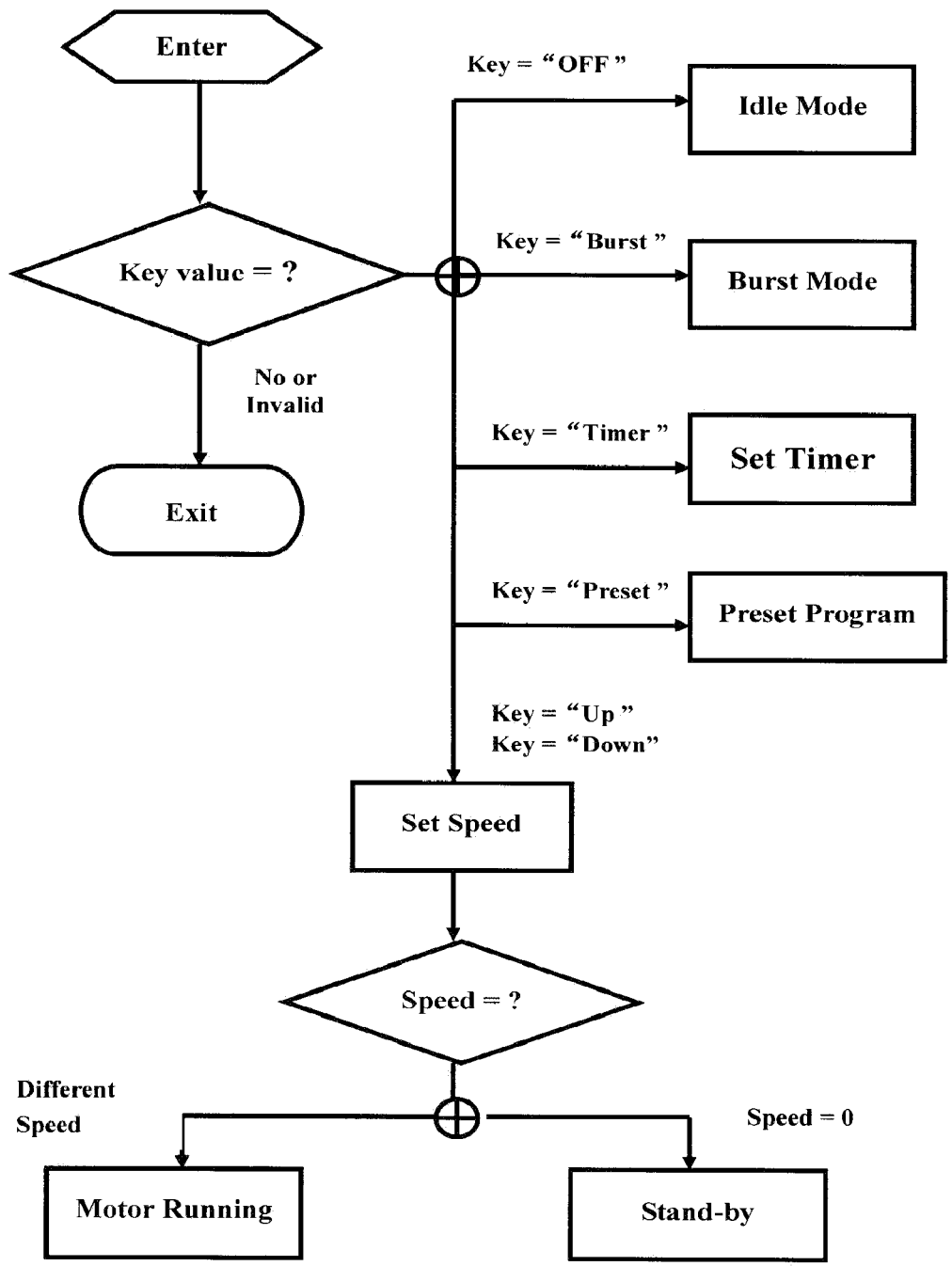
FIG. 9 is a flowchart illustrating the process of key detection and operating mode of the programmable electronic hand mixer.

FIG. 9 is a flowchart illustrating operation mode of the electronic hand mixer and the process of operation detection. If the "OFF" key on the control panel (in FIG. 2) is pressed, the hand mixer will be set to the idle mode. If the "Burst" key on the control panel (in FIG. 2) is pressed, the hand mixer will be set to the burst mode, which will be discussed in detail. If the "Timer" key on the control panel (in FIG. 2) is pressed, the timer of hand mixer will be reset. If the "Preset" key on the control panel (in FIG. 2) is pressed, the hand mixer will be in the preset mixing courses, which will be discussed in detail. The speed of the motor can be adjusted by pressing the "Up" and "Down" keys on the control panel. If the speed of the motor is set to zero, the hand mixer is in the standby mode. If different speeds of the motor are selected, the motor starts to run at different speeds.

Figure 10:
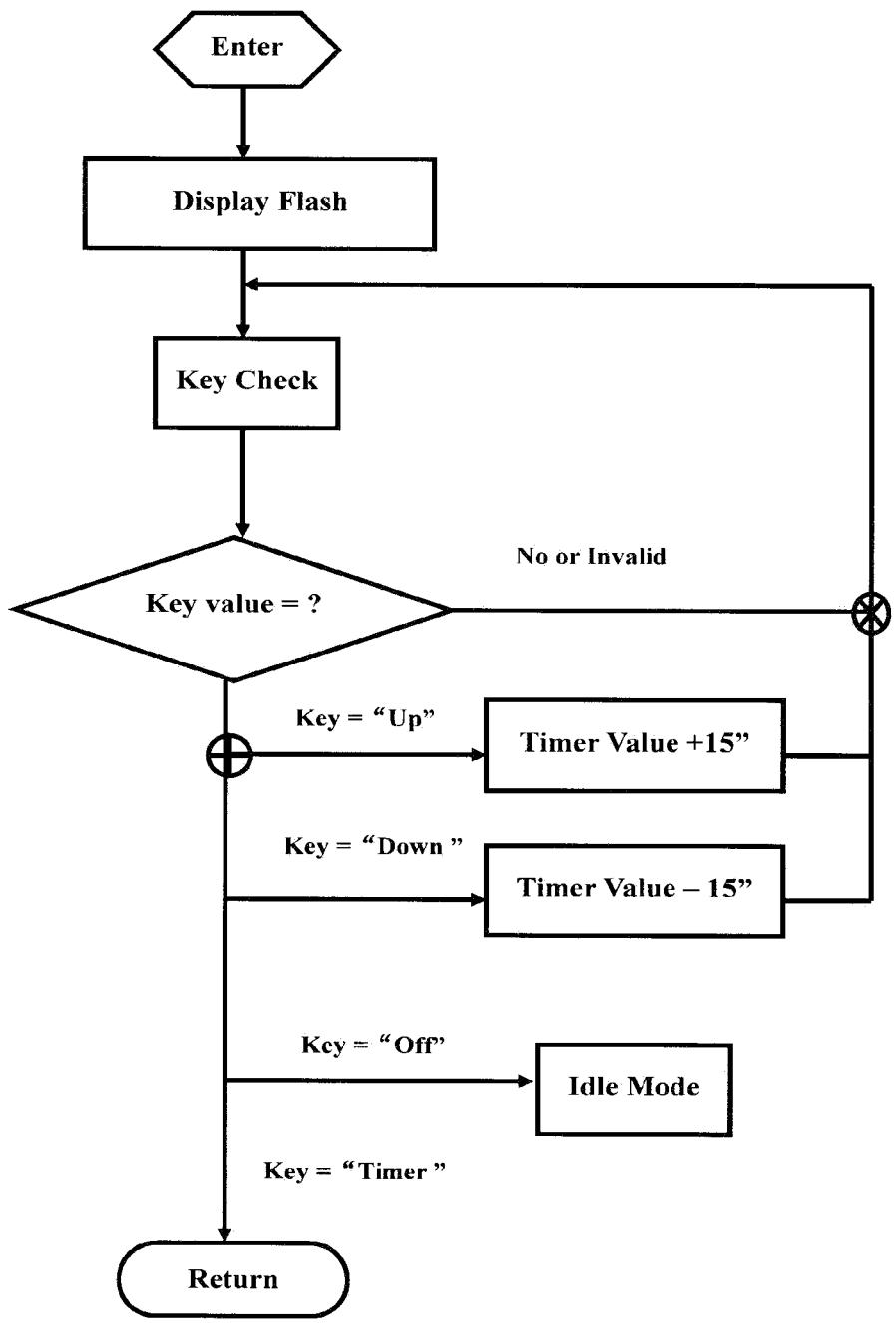
FIG. 10 is a flowchart illustrating the countdown timer setup process of the programmable electronic hand mixer.

FIG. 10 is a flowchart illustrating an example countdown timer setup process of the programmable electronic hand mixer. Once the "Timer" key on the control panel (in FIG. 2) is pressed during the standby mode, the countdown timer setting program will be executed. The user can easily set up a user-defined running period of time of the drive motor or desired mixing time $t_{mix}$ (e.g., 120 seconds) at a predetermined running speed of the drive motor by pressing the "Up" and "Down" keys on the control panel. The micro-controller then proceeds to run the motor. Once the desired mixing time $t_{mix}$ is reached, the micro-controller will stop to run the motor, and mixer will go back to the standby mode. With the countdown timer, the user can let the electronic hand mixer run when he or she is away for a moment. The user does not have to be on site when the electronic hand mixer is running. In one embodiment, the memory stores at least one desired mixing time $t_{mix}$. Therefore, when the user needs to conduct another mixing operation, the stored mixing time $t_{mix}$ can be used. The user can use the previously stored mixing time without making changes or set another desired mixing time by pressing the "up" and "down" keys on the control panel to do the mixing job.

Figure 11:
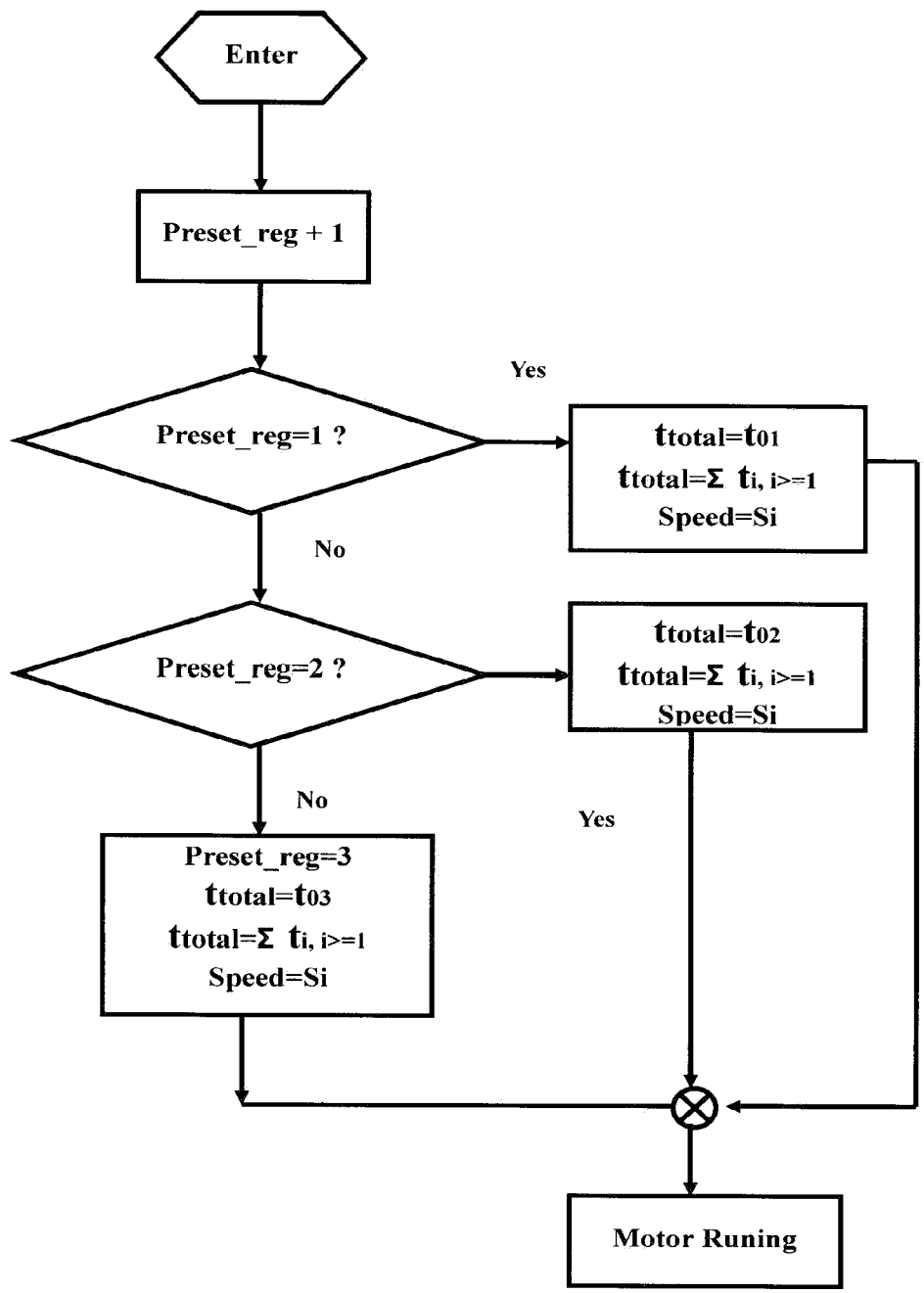
FIG. 11 is a flowchart illustrating the preset mixing courses of the programmable electronic hand mixer.

FIG. 11 is a flowchart illustrating user-defined mixing courses of the programmable electronic hand mixer. Once the "Preset" key on the control panel (in FIG. 2) is pressed under the standby or operating mode, at least one user-defined mixing course can be operated. The mixing course is the combination of one or more running time periods of the motor (total operating time $t_{total} = \Sigma t_{i,\ i>=1}$), and each of the running time periods is associated with a user-defined motor running speed $S_i$. Different mixing courses are generally used for mixing different food materials or for different recipes. The user can set up a complicated mixing course, which will be saved in the memory. The saved mixing course can be used next time, and the user will get a consistent mixing result without setting up the same mixing course each time.

Table 1 shows an example mixing course of the electronic hand mixer, which is set up by the user. This mixing course is saved in the in the memory, which can be used repeatedly.

TABLE 1

| Step | Speed (rpm) | Time (second) | Remarks |
|---|---|---|---|
| 1 | 198 | 120 | |
| 2 | 678 | 60 | |
| 3 | 1158 | 30 | |
| 4 | 798 | 30 | |
| 5 | 0 | 20 | |
| 6 | 198 | 10 | |
| 7 | Motor Off | | Standby Mode |

In Step 1, the motor runs at Speed1 for 120 seconds; in Step 2, the motor runs at Speed2 for 60 seconds; in Step 3, the motor runs at Speed9 for 30 seconds; in Step 4, the motor runs at Speed6 for 30 seconds; in Step 5, the motor runs at zero speed for 20 seconds; in Step 6, the motor runs at Speed1 for 10 seconds; and in Step 7, the motor stops running, and hand mixer goes to the standby mode.

Table 2 shows another example mixing course of the electronic hand mixer, which is set up by the user. This mixing course is saved in the in the memory, which can be used repeatedly.

TABLE 2

| Step | Speed (rpm) | Time (second) | Remarks |
|---|---|---|---|
| 1 | 198 | 20 | |
| 2 | 438 | 20 | |
| 3 | 798 | 20 | |
| 4 | 1158 | 20 | |
| 5 | 918 | 20 | |
| 6 | 678 | 20 | |
| 7 | 438 | 20 | |
| 8 | Maximum Speed | 20 | Burst Mode |
| 9 | 438 | 20 | |
| 10 | 198 | 20 | |
| 11 | Motor off | | Standby Mode |

In Step 1, the motor runs at Speed1 for 20 seconds; in Step 2, the motor runs at Speed3 for 20 seconds; in Step 3, the motor runs at Speed6 for 20 seconds; in Step 4, the motor runs at Speed9 for 20 seconds; in Step 5, the motor runs at Speed7 for 20 seconds; in Step 6, the motor runs at Speed2 for 20 seconds; in Step 7, the motor runs at Speed3 for 20 seconds; in Step 8, the motor runs at the maximum speed (Burst mode) for 20 seconds; in Step 9, the motor runs at Speed3 for 20 seconds; in Step 10, the motor runs at Speed1 for 20 seconds; and in Step 11, the motor stops running, and hand mixer goes to the standby mode.

Figure 12:
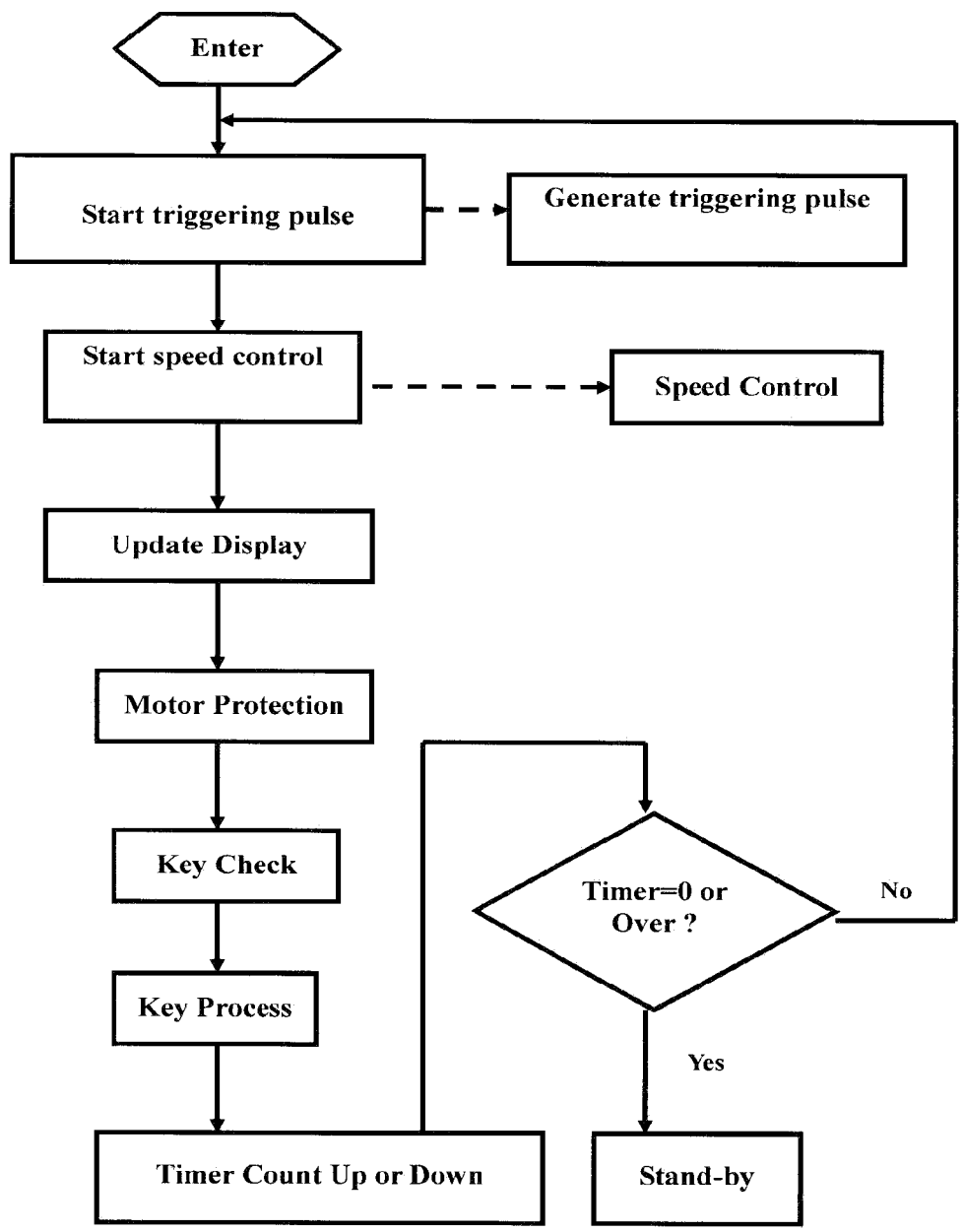
FIG. 12 is a flowchart illustrating the process of motor running of the programmable electronic hand mixer.

FIG. 12 is a flowchart illustrating the process of motor running of the programmable electronic hand mixer. Once the motor running is request, the micro-controller 9 will generate a triggering pulse to drive the TRIAC which synchronizes with the AC zero-crossing signal if a TRIAC is used as a power control device. If a MOSFET is used as a power control device, the micro-controller 9 will generate a PWM triggering pulse for the MOSFET. In order to keep the motor running speed within a desired range, the fire angle for the TRIAC or the PWM ratio for the MOSFET will be changed based on the speed feedback signal.

Figure 13:
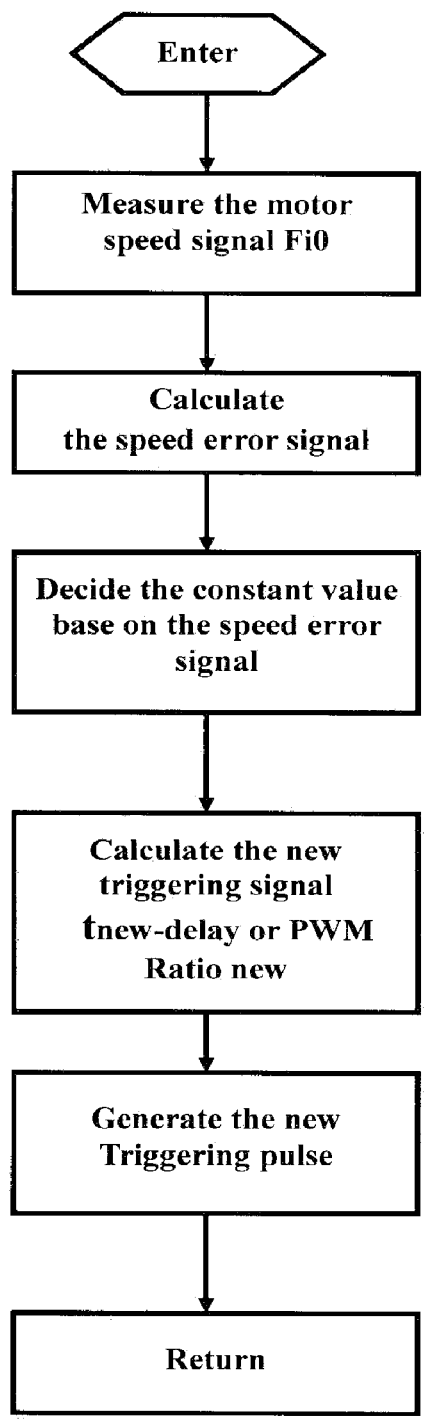
FIG. 13 is a flowchart illustrating the motor speed control feature of the programmable electronic hand mixer.

FIG. 13 is a flowchart illustrating the motor speed control feature of the programmable electronic hand mixer. Once the motor running is request, the micro-controller 9 will generate a triggering pulse to drive the TRIAC which synchronizes with the AC zero-crossing signal if a TRIAC is used as a power control device. If a MOSFET is used as a power control device, the micro-controller 9 will generate a PWM triggering pulse for MOSFET, in order to keep the motor running speed within a desire range. The fire angle for the TRIAC or the PWM ratio for the MOSFET will be changed based on the speed feedback signal.

The detailed method of motor speed control is described below. Assuming the motor target speed for each step is $S_{i0}$ rpm, the motor gear ratio is mG, and the magnet number of poles is N. The center feedback frequency is:

$$F_{i0} = S_{i0} * mG * N/60 \text{ sec (Hz)}$$

The actual feedback frequency $F_i$, however, is not equal to the center feedback frequency $F_{i0}$. The speed error signal $\Delta F_i$ is:

$$\Delta F_i = F_i - F_{i0}$$

If the speed error signal $\Delta F_i = 0$, the motor's actual speed is equal to the target speed, and the energy supplied to the motor should be kept.

If the speed error signal $\Delta F_i > 0$, the motor's actual speed is higher than the target speed, the energy supplied to the motor should be reduced.

If the speed error signal $\Delta F_i < 0$, the motor's actual speed is lower than the target speed, the energy supplied to the motor should be increased.

Figure 17:
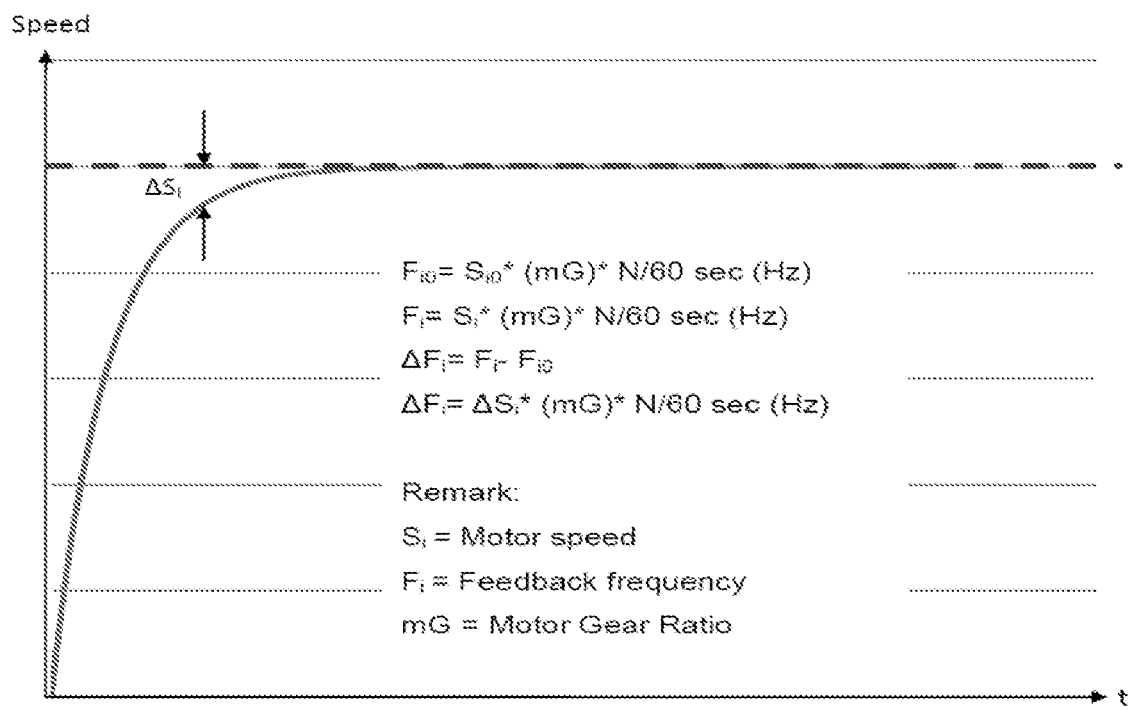
FIG. 17 illustrates a speed error signal.

FIG. 17 illustrates a speed error signal.

Therefore, if the TRIAC is used as a power control device, the triggering delay time $t_{new\ delay}$ is:

$$t_{new\ delay} = t_{current\ delay} + (\Delta F_i / F_{i0}) * A$$

where A is a constant value depending on the value of speed error signal $\Delta F_i$ The delay time $t_{delay}$ can be increased to reduce the power supplied to the motor so as to reduce the motor speed, and the delay time $t_{delay}$ can be decreased to increase the power supplied to the motor so as to increase the motor speed.

Figure 18:
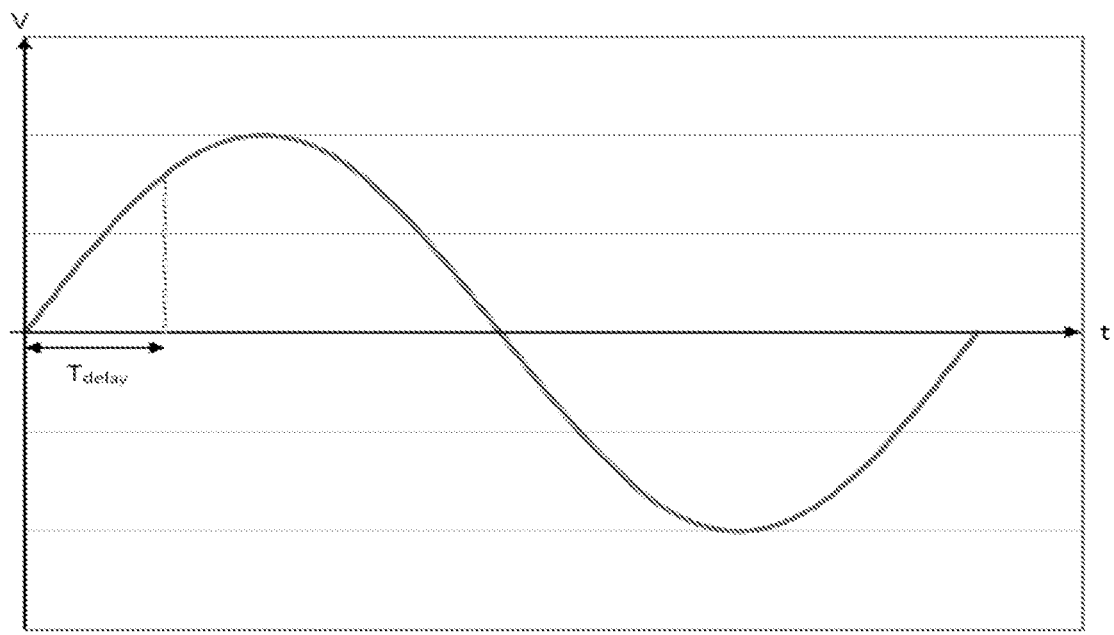
FIG. 18 illustrates a TRIAC Waveform.

FIG. 18 illustrates a TRIAC Waveform.

If the MOSFET is used as a power control device, the PWM triggering ratio $Ratio_{new}$ is:

$$Ratio_{new} = Ratio_{current} - (\Delta F_i / F_{i0}) * B$$

where B is a constant value depending on the value of the speed error signal $\Delta F_i$.

The PWM triggering ratio can be increased to increase the power supplied to the motor so as to increase the motor speed, and the PWM triggering ratio can be decreased to decrease the power supplied to the motor so as to decrease the motor speed.

Figure 19:
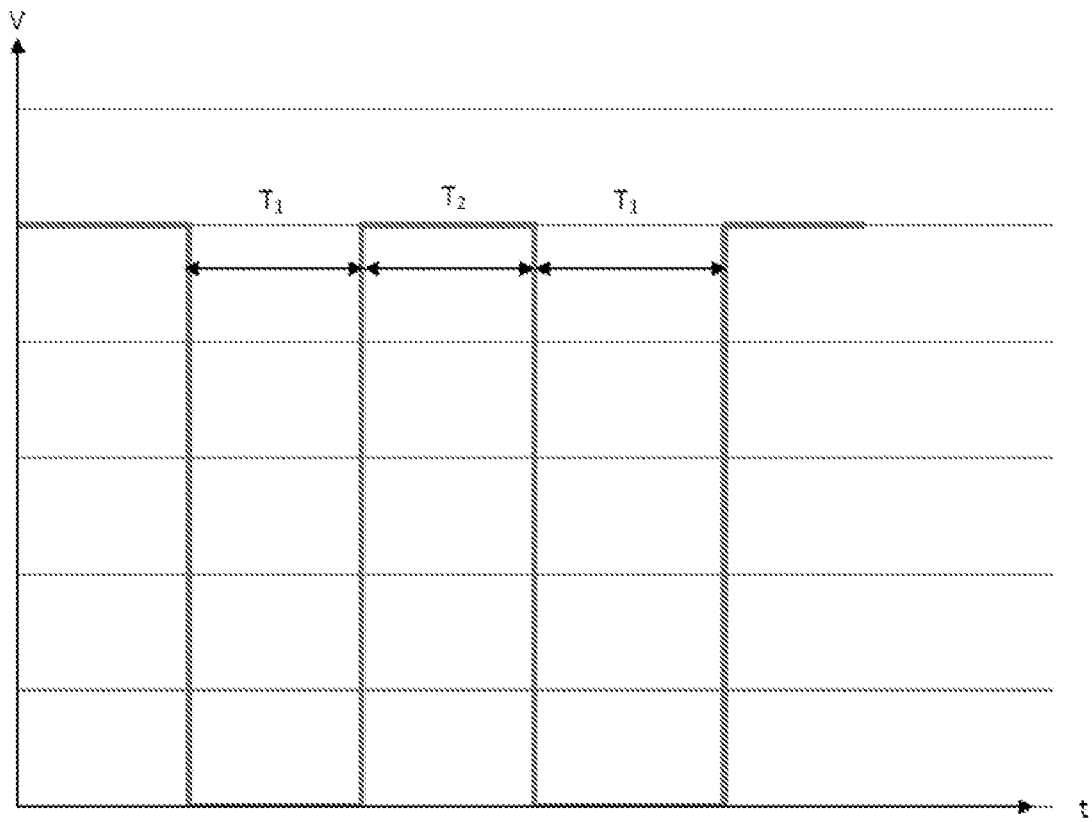
FIG. 19 illustrates a MOSFET PWM Waveform.

FIG. 19 illustrates a MOSFET PWM Waveform.

As the system has an accurate and quick feedback control loop, the motor speed can be below 200 rpm with a small tolerance of +20 rpm or −20 rpm.

The examples below illustrate how the motor speed control feature of the programmable electronic hand mixer works.

Initial setting is:

| | | |
|---|---|---|
| a) Motor's Target Speed | | $S_0 = 200$ rpm |
| b) Gear ratio | | mG = 10 |
| c) Number of pole of magnet | | N = 2 |
| d) When TRIAC is used as a power control device, | | |
| | $t_{0\ delay} = 3$ ms | |
| | When MOSEFT is used as a power control device, | |
| | $Ratio_0 = 0.5$ | |

Feedback Frequency:

$$F_0 = S_0 * mG * N/60 \text{ sec (Hz)}$$
$$= 200 * 10 * 2/60 \text{ sec (Hz)}$$
$$= 66.67 \text{ Hz}$$

Scenario A: The hand mixer is doing some jobs
Assuming the motor speed $S_1 = 250$ rpm $$F_1 = S_1 * mG * N/60 \text{ sec (Hz)}$$
$$= 250 * 10 * 2/60 \text{ sec (Hz)}$$
$$= 83.33 \text{ Hz}$$

Since $F_1 \neq F_0$, speed error signal $$\Delta F = F_1 - F_0$$
$$= 83.33 - 66.67 \text{ Hz}$$
$$= 16.66 \text{ Hz}$$

i) When TRIAC is used as a power control device
New TRIAC delay $$t_{1\ delay} = t_{0\ delay} + (\Delta F / F_0) * A$$
$$= 3 \text{ ms} + (16.66/66.67) * A$$
$$= (3 + 0.25A) \text{ ms}$$

where A is a constant depending on the value of speed error signal $\Delta F$.

Since $t_{0\ delay} < t_{1\ delay}$, delay trigger TRIAC timing is increased. As a result, power supplied to the motor is decreased, and the motor speed is decreased.

Return to beginning and check the motor speed until the speed is within the motor's target speed 200 rpm.

ii) When MOSFET is used as a power control device
New PWM ratio $$Ratio_1 = Ratio_0 - (\Delta F_i / F_{i0}) * B$$
$$= 0.5 - (16.66/66.67) * B$$
$$= 0.5 - 0.25B$$

where B is a constant depending on the value of speed error signal $\Delta F_i$.

Since $Ratio_0 > Ratio_1$, PWM triggering ratio is decreased. As a result, power supplied to the motor is decreased, and the motor speed is decreased.

Return to beginning and check the motor speed until the speed is within the motor's target speed 200 rpm.
Scenario B: The hand mixer is doing some jobs
Assuming the motor speed $S_2$=150 rpm $$F_2 = S_2 * mG * N/60 \text{ sec (Hz)}$$
$$= 150 * 10 * 2/60 \text{ sec (Hz)}$$
$$= 50 \text{ Hz}$$

Since $F_2 \neq F_0$, speed error signal $$\Delta F = F_2 - F_0$$
$$= 50 - 66.67 \text{ Hz}$$
$$= -16.67 \text{ Hz}$$

i) When TRIAC is used as a power control device
New TRIAC delay $$t_{2\ delay} = t_{0\ delay} + (\Delta F/F_0) * A$$
$$= 3 \text{ ms} + (-16.67/66.67) * A$$
$$= (3 - 0.25A) \text{ ms}$$

Where A is a constant depending on the value of speed error signal $\Delta F$.
Since $t_{0\ delay} > t_{2\ delay}$, delay Trigger TRIAC timing is decreased. As a result, power supplied to the motor is increased, and the motor speed increased.
Return to beginning and check the motor speed until the speed within the motor's target speed 200 rpm.
ii) When MOSFET is used as a power control device
New PWM ratio $$Ratio_2 = Ratio_0 - (\Delta F_i/F_{i0}) * B$$
$$= 0.5 - (-16.66/66.67) * B$$
$$= 0.5 + 0.25B$$

Since $Ratio_0 < Ratio_2$, PWM ratio is increased. As a result, power supplied to the motor is increased, and the motor speed is increased.
Return to beginning and check the motor speed until the speed is within the motor's target speed 200 rpm.

Figure 14:
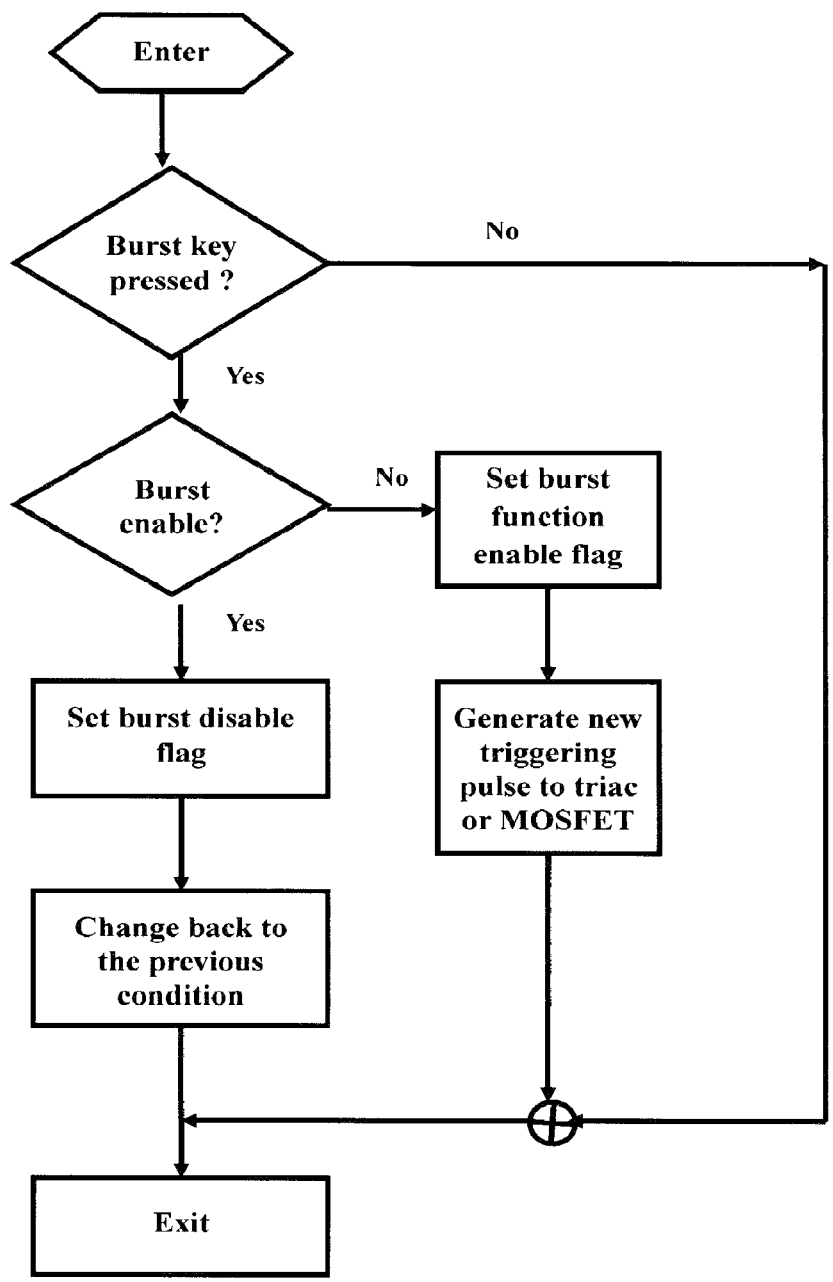
FIG. 14 is a flowchart illustrating the burst mode of the programmable electronic hand mixer.

FIG. 14 is a flowchart illustrating that the motor of the programmable electronic hand mixer is in its burst mode. When the "Burst" key on the control panel (in FIG. 2) is pressed either in standby or operating mode, the micro-controller 9 will generate a triggering pulse to drive the motor with maximum power which synchronizes with the AC zero-crossing signal if a TRIAC is used as a power control device. If a MOSFET is used as a power control device, the micro-controller 9 will generate a 100% ratio PWM triggering pulse for MOSFET. The hand mixer will go back to previous condition when the "Burst" key is pressed again, and the burst function will be cancelled. The burst feature provides the hand mixer with a high speed mixing function that the conventional electronic or mechanical controlled hand mixer does not have.

Figure 15:
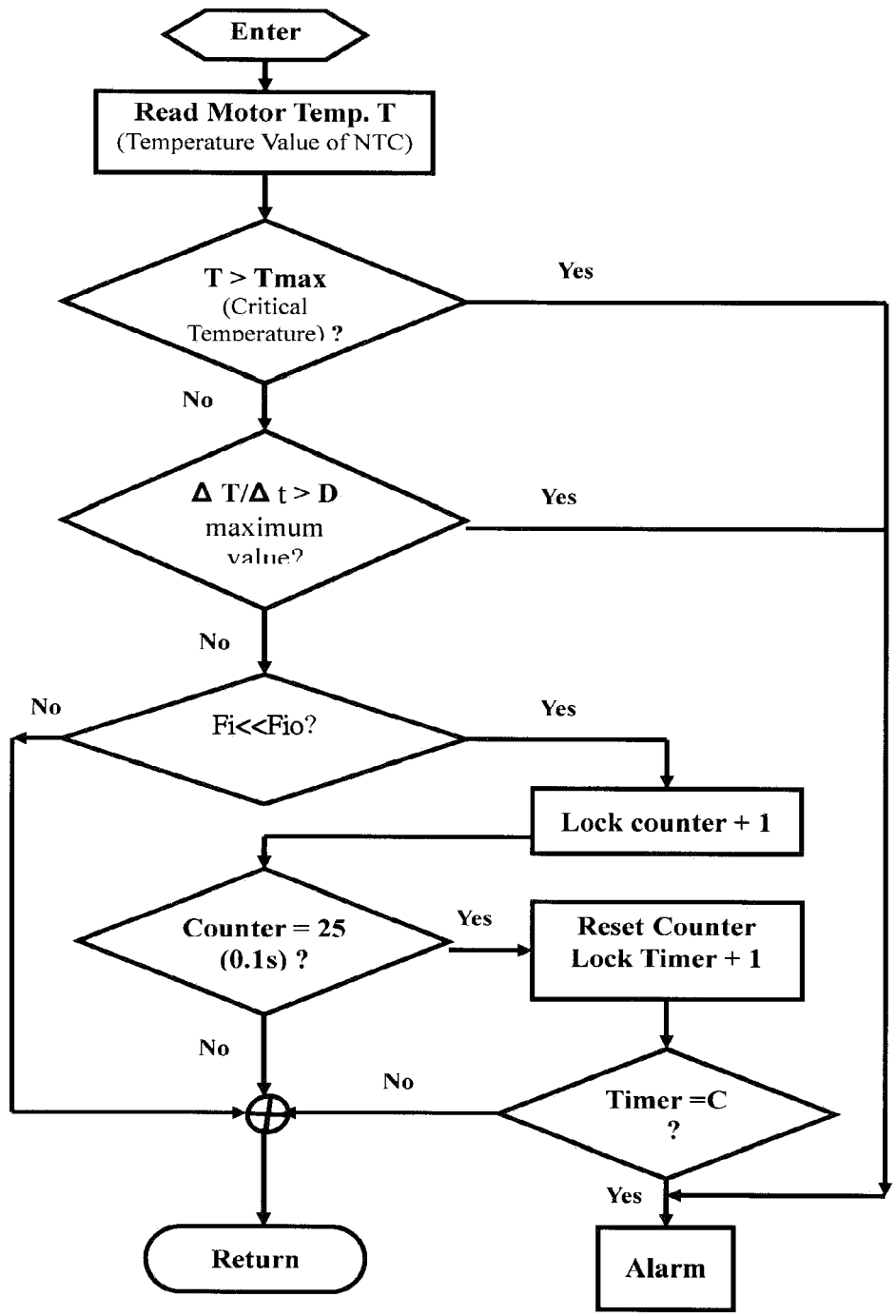
FIG. 15 is a flowchart of the motor protection feature of the programmable electronic hand mixer.
Figure 20:
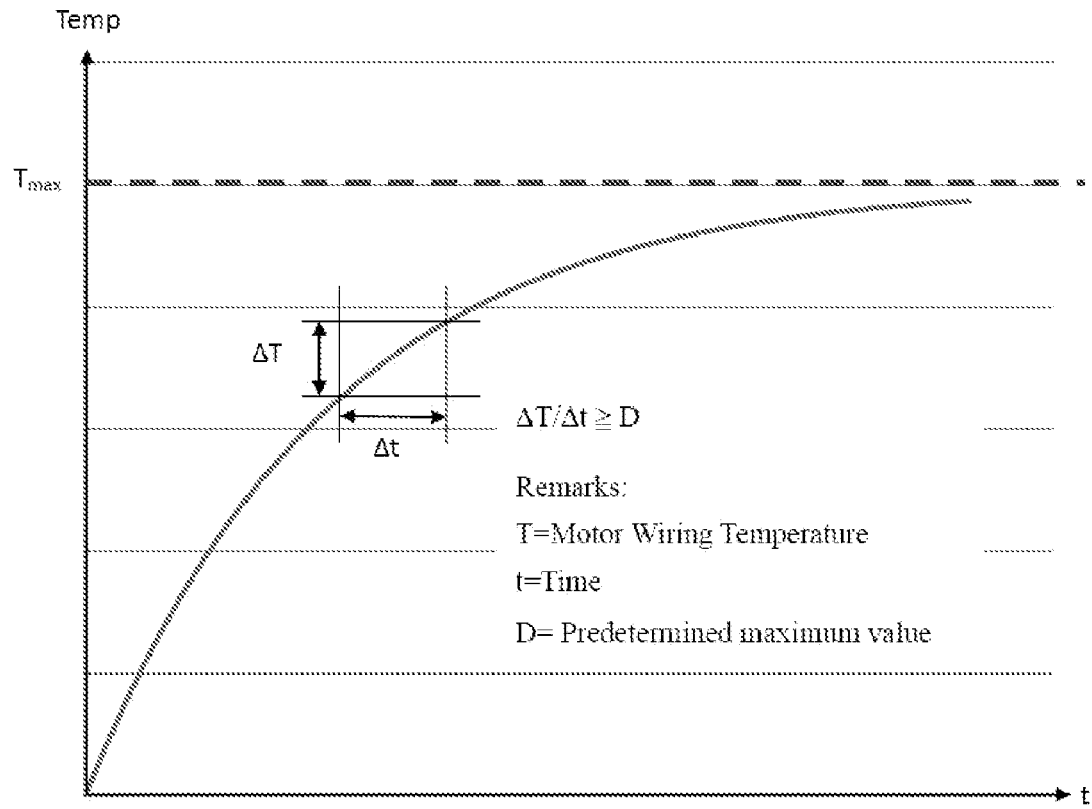
FIG. 20 illustrates a $\Delta T/\Delta t$ Curve.

FIG. 15 is a flowchart of the motor protection feature of the programmable electronic hand mixer. There are three ways to protect the drive motor of the electronic hand mixer under the operating condition. The first way starts when the motor temperature rises and reaches a predetermined maximum temperature due to the heavy load of the food materials being processed. The second way starts when the motor temperature rising speed reaches and passes a predetermined maximum value due to the heavier load of the food materials being processed. Even though the maximum temperature of the drive motor is not reached, the micro-controller 9 will still cut the power to motor to avoid the motor damage. The temperature rising ratio $\Delta T/\Delta t$ is used to achieve this function (see the $\Delta T/\Delta t$ curve below). The third way is to use the motor speed feedback signal Fi to protect the motor when it is locked. If the motor speed feedback signal Fi is equal to zero or greatly lower than a target value, the micro-controller 9 will cut the power to the drive motor after a certain period of time (constant C) to avoid motor damage due to motor locking. FIG. 20 illustrates a $\Delta T/\Delta t$ Curve.

Figure 16:
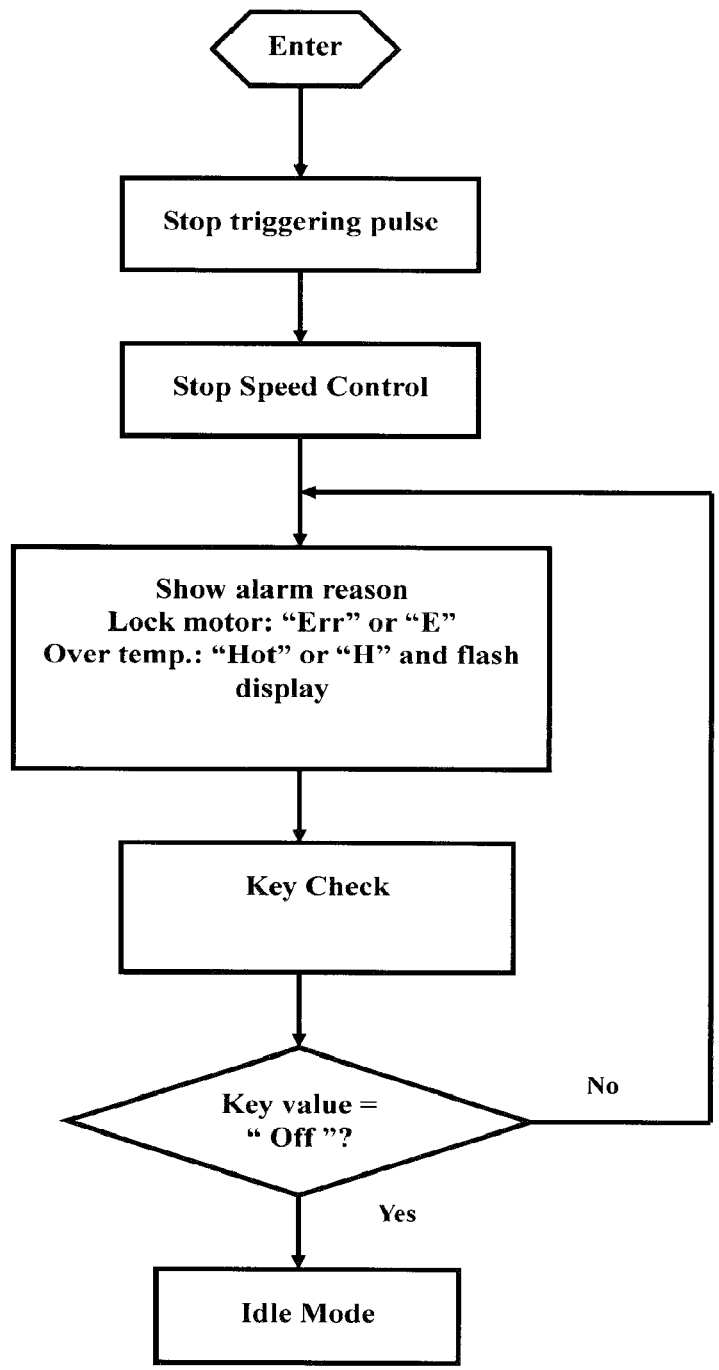
FIG. 16 illustrates that the micro-controller 9 acts after the protection of motor is made.

FIG. 16 illustrates that the micro-controller 9 acts after the protection of motor is made. When the temperature or temperature rising speed is over the predetermined maximum value (D), a message "Hot" will be displayed. An "Err" signal will show on the display if lock motor condition happened. This condition only can be reset by turning off the hand mixer.

While the present patent application has been shown and described with particular references to a number of embodiments thereof, it should be noted that various other changes or modifications may be made without departing from the scope of the present invention.

What is claimed is:

1. An electronic hand mixer for processing food materials, comprising:
   one or more beaters;
   a housing;
   a drive motor mounted in the housing, the drive motor adapted to apply rotational force to the beaters;
   a power control device for controlling electrical power supplied to the drive motor;
   a keypad for receiving instructions entered by users;
   a microprocessor for processing the instructions and sending signals to the power control device;
   and a memory for storing the instructions, wherein:
   the instructions comprise at least one user-defined mixing course, the user-defined mixing course comprises one or more mixing operations, and each of the mixing operations comprises a user-defined running speed of the drive motor associated with a user-defined running period of time of the drive motor;
   when a motor temperature rising speed reaches and passes a predetermined maximum value, the operation for protecting the drive motor is started; and when a motor speed feedback signal is equal to zero or is greatly lower than a target value, the operation for protecting the drive motor is started.

2. The electronic hand mixer of claim 1 wherein at least one of the mixing operations comprises a user-defined running speed of the drive motor being equal to a maximum speed of the drive motor.

3. The electronic hand mixer of claim 1 wherein the power control device is responsive to a speed error signal to adjust the electronic power supplied to the drive motor resulting in an actual speed of the drive motor being within a predetermined speed range irrespective of work load of the electronic hand mixer.

4. The electronic hand mixer of claim 1 wherein: the drive motor is adapted to run to conduct a first mixing operation until the user-defined running period of time expires; and the user-defined running period of time is stored in the memory for being used for conducting a second mixing operation.

5. The electronic hand mixer of claim 4 wherein the user-defined running period of time stored in the memory is adapted to be increased or decreased before the second mixing operation starts.

6. The electronic hand mixer of claim 1 wherein the user-defined running period of time of the drive motor is displayed in a counter down mode by displaying a remainder of the user-defined running period of time.

7. The electronic hand mixer of claim 1 comprising an automatic shut-off feature.

8. An electronic hand mixer for processing food materials, comprising:
one or more beaters;
a housing;
a drive motor mounted in the housing, the drive motor adapted to apply rotational force to the beaters;
a power control device for controlling electrical power supplied to the drive motor;
a keypad for receiving instructions entered by users;
a microprocessor for processing the instructions and sending signals to the power control device;
a memory for storing the instructions, wherein:
the power control device is responsive to a speed error signal to adjust the electronic power supplied to the drive motor resulting in an actual speed of the drive motor being within a predetermined speed range irrespective of work load of the electronic hand mixer.

9. The electronic hand mixer of claim 8 wherein the microprocessor is adapted to generate a triggering pulse which synchronizes with an AC zero-crossing signal.

10. The electronic hand mixer of claim 8 wherein the microprocessor is adapted to generate a triggering pulse to drive the motor with a maximum power, which synchronizes with an AC zero-crossing signal.

11. The electronic hand mixer of claim 8 wherein: the instructions comprise a user-defined running period of time of the drive motor at a predetermined running speed of the drive motor; the drive motor is adapted to run to conduct a first mixing operation until the user-defined running period of time expires; and the user-defined running period of time is stored in the memory for being used for conducting a second mixing operation.

12. The electronic hand mixer of claim 11 wherein the user-defined running period of time of the drive motor is displayed in a counter down mode by displaying a remainder of the user-defined running period of time.

13. The electronic hand mixer of claim 11 wherein the user-defined running period of time stored in the memory is adapted to be increased or decreased before the second mixing operation starts.

14. The electronic hand mixer of claim 8 wherein at least one of the mixing operations comprises a user-defined running speed of the drive motor being equal to a maximum speed of the drive motor.

15. The electronic hand mixer of claim 8 comprising an automatic shut-off feature.

16. An electronic hand mixer for processing food materials, comprising:
one or more beaters;
a housing;
a drive motor mounted in the housing, the drive motor adapted to apply rotational force to the beaters;
a power control device for controlling electrical power supplied to the drive motor;
a keypad for receiving instructions entered by users;
a microprocessor for processing the instructions and sending signals to the power control device;
a memory for storing the instructions, wherein:
the instructions comprise at least one user-defined mixing course, the user-defined mixing course comprises one or more mixing operations, and each of the mixing operations comprises a user-defined running speed of the drive motor associated with a user-defined running period of time of the drive motor; when a temperature of the drive motor rises and reaches a predetermined maximum temperature, an operation for protecting the drive motor is started;
when a motor temperature rising speed reaches and passes a predetermined maximum value, the operation for protecting the drive motor is started; and when a motor speed feedback signal is equal to zero or is greatly lower than a target value, the operation for protecting the drive motor is started.

17. The electronic hand mixer of claim 16 wherein at least one of the mixing operations comprises a user-defined running speed of the drive motor being equal to a maximum speed of the drive motor.

18. The electronic hand mixer of claim 16 wherein: the drive motor is adapted to run to conduct a first mixing operation until the user-defined running period of time expires; and the user-defined running period of time is stored in the memory for being used for conducting a second mixing operation.

19. The electronic hand mixer of claim 16 wherein the user-defined running period of time of the drive motor is displayed in a counter down mode by displaying a remainder of the user-defined running period of time.

20. The electronic hand mixer of claim 16 comprising an automatic shut-off feature.

* * * * *